United States Patent
Grybos et al.

[19]

[11] Patent Number: 5,986,619
[45] Date of Patent: Nov. 16, 1999

[54] MULTI-BAND CONCENTRIC HELICAL ANTENNA

[75] Inventors: David P. Grybos, San Jose; Charles C. Hung, Los Altos Hills, both of Calif.

[73] Assignee: Leo One Ip, L.L.C., St. Louis, Mo.

[21] Appl. No.: 08/646,218

[22] Filed: May 7, 1996

[51] Int. Cl.⁶ .................................................. H01Q 1/36
[52] U.S. Cl. ..................... 343/895; 343/853; 343/DIG. 2
[58] Field of Search ..................... 343/895, 850, 343/853, 778, 858, DIG. 1, DIG. 2; H01Q 11/08, 1/36, 21/20

[56] References Cited

U.S. PATENT DOCUMENTS

| | | |
|---|---|---|
| 2,611,868 | 9/1952 | Marston et al. . |
| 3,599,220 | 8/1971 | Dempsey . |
| 4,148,030 | 4/1979 | Foldes . |
| 4,494,117 | 1/1985 | Coleman ................................. 343/895 |
| 5,255,005 | 10/1993 | Terret et al. . |
| 5,619,218 | 4/1997 | Salvail et al. ........................... 343/895 |

FOREIGN PATENT DOCUMENTS

| | | |
|---|---|---|
| 0 666 612 A2 | 8/1995 | European Pat. Off. . |
| 1204354A | 1/1960 | France . |
| 2091927A | 1/1972 | France . |
| 0143638 | 8/1983 | Japan ............................... 343/DIG. 2 |
| 0065604 | 4/1986 | Japan ............................ H01Q 11/08 |

OTHER PUBLICATIONS

Spacecraft Antennas, The ARRL Antenna Book, pp. 20–1 to 20–7, 1988.

"A Spherical Helical Antenna", by J.C. Cardoso and A. Safaai-Jazi, published in IEEE on Jun. 28, 1993, pp. 1558–1561.

"Helical Antennas", by King et al., in The Antenna Engineering Handbook, McGraw–Hill, New York, NY, 1993, Chap. 13.

"The Helical Antenna", by J.D. Kraus, in Antennas, McGraw–Hill, New York, NY, 1988, Chap. 7.

The Antenna Handbook, edited by Y.T. Lo & S.W. Lee, Van Nostrand Renhold Company, NY, 1988, pp. 3–31 & 27–15 to 27–19.

*Primary Examiner*—Hoanganh Le
*Assistant Examiner*—Tho Phan
*Attorney, Agent, or Firm*—Anglin & Giaccherini

[57] ABSTRACT

A Multi-Band Concentric Helical Antenna (20) operating in a novel conical mode, useful for general and satellite communications is disclosed. A higher frequency helix (24) is placed concentrically inside a lower frequency one (22). In one embodiment, each helix has four helical elements (22a–d, 24a–d). The outer helix is fed at a first frequency ($f_1$) and the inner helix (24) is fed at a second frequency ($f_2$). The second frequency ($f_2$) may be greater than twice the first frequency ($f_1$). Both helices (22, 24) have the same polarization. The pitch ($P_1$, $P_2$), diameter ($D_1$, $D_2$), and length ($AL_1$, $AL_2$) of the helices are chosen so that said antenna (20) radiates with approximately equal flux at all points in a far-field plane. Alternatively, two inner helices (24, 25) are placed concentrically within an outer helix (22). In a space application, the helices (22, 24) may be air wound springs (22a–d, 24a–d), compressed flat prior to a launch and deployed to fall length in flight. Another embodiment (50) features helically-wound tape (54, 56) wound on inflatable, non-conducting supports (52, 58) concentrically positioned and deployed in space to form the concentric helices (54, 56).

13 Claims, 26 Drawing Sheets

VIEW A-A

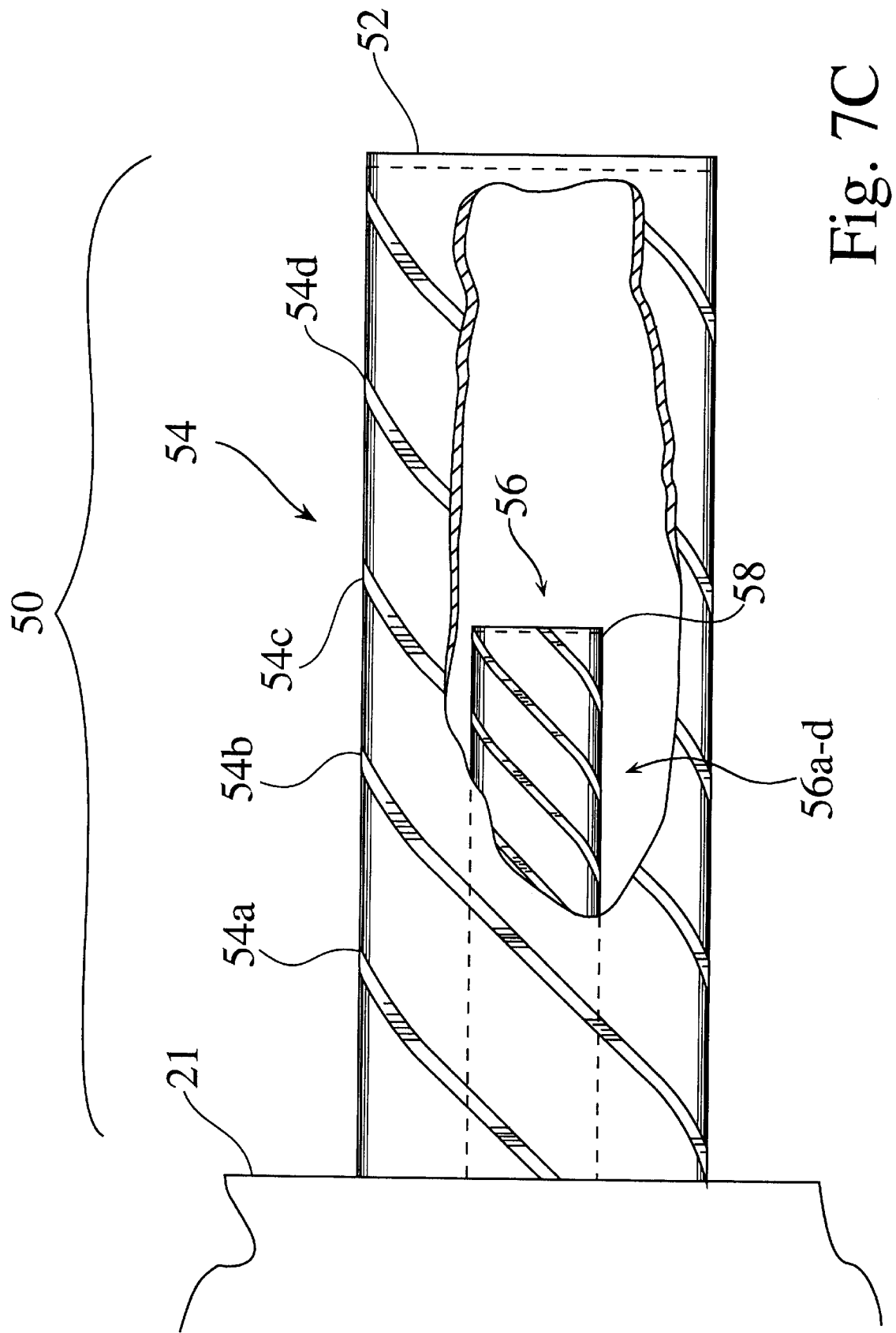

MULTI-BAND CONCENTRIC HELICAL ANTENNA

REFERENCE TO RELATED PATENT APPLICATIONS

The present Application is related to the following commonly-owned and commonly-assigned Patent Applications:

Polar Relay Method for Satellite System by James R. Stuart, filed on Apr. 18, 1995 and assigned U.S. Ser. No. 08/423,673 and claiming the benefit of priority of a Parent Application entitled Polar Relay Method for Satellite System by James R. Stuart, filed on Nov. 09, 1993 and assigned U.S. Ser. No. 08/149,574;

Satellite System Using Equatorial & Polar Orbit Relays by Mark A. Sturza et al., filed on Jun. 6, 1995 and assigned U.S. Ser. No. 08/466,176, and claiming the benefit of priority of a Parent Application entitled Satellite System Using Equatorial & Polar Orbit Relays by Mark A. Sturza et al., filed on Mar. 28, 1994, and assigned U.S. Ser. No. 08/216,820; and Optimal Coverage Satellite System by Mark A. Sturza et al., filed on Oct. 12, 1994 and assigned U.S. Ser. No. 08/319,819.

FIELD OF THE INVENTION

The present invention relates to the field of antennas. More particularly, this invention provides a multi-frequency, concentric helical or spiral antenna which produces a novel conical mode radiation pattern and whose compact configuration provides significant advantages for communications. These antennas have general use in multi-frequency, two-way radio communications and are particularly useful for communications between ground stations and non-geostationary satellites. Opportunities for use may be found in satellites in low Earth orbit (LEO), medium Earth Orbit (MEO), highly elliptical orbit (BEO) or geostationary orbit (GEO) and for communication between ground-based stations.

BACKGROUND OF THE INVENTION

Simple helical antennas appear to have been investigated thoroughly by many persons skilled in the antenna art and are currently used in many different applications. The helical antenna represents a transition between linear-element antennas and loop antennas.

The *Antenna Handbook,* edited by Y. T. Lo and S. W. Lee, Van Nostrand Reinhold Company, New York, N.Y., 1988, describes helical circularly polarized antennas in FIG. 6 at page 3–31, pages 27-15 through 27-17 and in FIGS. 14 through 19. Single helices and multiple (bifilar) helices for single antennas are illustrated.

A detailed presentation of the basic concepts and analysis of the helical antenna is supplied in *Antennas,* Second Edition, by J. D. Kraus, McGraw-Hill, New York, N.Y., 1988, in Chapter 7. Satellite-borne arrays of side-by-side helices are shown. Kraus also depicts a number of antenna configurations including a driven helix having a parasitic helix of about the same diameter wound over it for producing increased gain. He also describes end-to-end helices.

In *The Antenna Engineering Handbook,* R. C. Johnson, Editor, Third Edition, McGraw-Hill, New York, N.Y., 1993, Chapter 13, King et al. present a detailed description of the performance of helical antennas. King et al. describe single or multiple conductors wound into a helical shape. They describe the axial, normal and higher order modes of operation. Helices with uniform diameter, non-uniform diameter and tapering diameters are discussed. The latter types of helices exhibit greater broad-band frequency response and better circular polarization over a wide band than does the helix with uniform diameter. King et al. discuss short axial mode helices as single antenna elements and in side-by-side arrays. They describe helical windings of circular wire and of ribbon-like flat windings on dielectric material.

As discussed by Kraus and King et al., the helical antenna has different modes of energy propagation which are controlled by its geometry. The most common are axial mode and normal mode. Axial mode, used most widely, provides maximum radiation along the helix axis. This mode occurs when the helix circumference is of the order of one wavelength of the propagated energy. The normal mode occurs when the helix diameter is small with respect to one wavelength and yields radiation generally directed broadside, that is, 90 degrees from the helix axis. Such helices are commonly used in flexible antennas for hand held transceivers and provide shorter antennas.

When a satellite communicates with Earth stations in very high frequency (VHF) and ultra high frequency (UHF) bands, two different helices having different geometry are generally required. One helix operates at VHF and the other smaller helix operates at UHF. The two helices are usually mounted separately, either linearly end-to-end, or side-by-side. However, there are disadvantages to each of these methods of mounting.

End-to-end mounting produces a very long antenna which requires a large stowage space or folding the antenna. Deployment on orbit becomes more difficult when the antenna is folded for stowage. Side-by-side mounting often results in asymmetric coverage by the two radiated beams. If an array of helical elements is needed for increased gain, this configuration can become too unwieldy to stow and deploy because of the volume it occupies.

It would be a significant commercial advantage for a multi-band antenna to be constructed with the higher frequency helix mounted concentrically within the lower frequency helix. Such a system would offer a much more compact antenna than those currently available. For example, as a result of the reduced length, the antenna could be compressed, "spring-like," for stowage aboard a launch vehicle and easily deployed to fill length on orbit by releasing the restraint on the "spring." Moreover, the helical elements could be sized to produce radiation in a novel conical mode which produces a radiation pattern with significant advantages for satellite-to-Earth station communications.

The inventors believe that persons skilled in the antenna arts have worked with designs that generally teach away from concentric helices. Others have proposed to use concentric helices with different polarization at the same frequency for uplink and downlink. A right hand helix might be used for uplink and a left hand helix for downlink. It is the inventors' understanding that this method proved unsuccessful in simulations.

Originally the inventors believed that mutual electric field coupling between concentric helices was much smaller than generally thought and pursued concentric helices operating at different frequencies. Successful designs were subsequently discovered when the frequency difference between concentric helices was at least two to one.

The development of a multi-band concentric helical antenna would constitute a major technological advance and would satisfy a long felt need in the satellite and telecommunications industries.

SUMMARY OF THE INVENTION

The present invention is a Multi-Band Concentric Helical Antenna which operates in a novel conical mode. A higher frequency helical element is placed concentrically inside a lower frequency helix. The helix dimensions are selected so that each helix radiates energy in the conical mode. The conical mode is a higher order radiation mode and can provide maximum radiation between 0 degrees and 90 degrees from the helix axis. The radiation pattern produced in the conical mode is advantageous for communication between non-geostationary satellites, particularly those in low Earth orbit (LEO), and ground stations. This radiation pattern is beneficial because it is maximum at the outer edge of the radiation pattern in the far-field plane and decreases, approximately according to the distance squared along the path from the antenna to the far-field plane. The radiation pattern produces nearly uniform radiated flux at all points on the Earth's surface within the footprint of a radiated beam.

Other opportunities for use of the Multi-Band Concentric Helical Antenna may be found in satellites in medium Earth Orbit (MEO), highly elliptical orbit (HEO) or geostationary orbit (GEO). The inventions may also abe used for multi-band communication between ground-based stations.

In the preferred embodiment, maximum radiation occurs around 60 degrees from the helix axis. Any length, diameter and pitch dimensions can be used so long as desired conical mode of operation results. Both the inner and outer helices can operate in the conical mode when concentrically located as described below. When used aboard a LEO satellite for satellite-to-ground communication, maximum radiation occurs at the edge of the radiated beam footprint on the Earth. Radiation decreases approximately according to the distance squared along the path from the satellite to the Earth to a minimum at the satellite's nadir. As a result, the radiated flux at all points on the Earth's surface within the beam footprint is nearly the same. The Multi-Band Concentric Helical Antenna is smaller than known linear, end-to-end, or side-by-side mounted, dual helices and yet performs, in the conical mode, equally well as these other antennas at all angles in azimuth from the helix axis.

The preferred number of helical elements (N) in the outer helix is a number equal to or greater than three. The start of the helical windings of all elements begins at the radiant energy-input end of the antenna. In the preferred embodiment, the N helical elements of the outer helix are connected at the start of their windings through a phase shifter to an antenna feed line which supplies radio frequency energy. The phase shifter supplies energy to each of the elements at phase angles of $(360°/N)*(i-1)$, where i equals 1, 2 . . . N.

The preferred number of helical elements (M) in the inner helix is also a number equal to or greater than three. The M helical elements of the inner helix are connected to a second antenna feed line through a second phase shifter. The second phase shifter supplies energy to each of the inner helix elements at phase angles of $(360°/M)*(i-1)$, where i equals 1, 2 . . . M. However, the start of the helical windings of the inner helix are "clocked," that is rotated about the helix axis, by $360°/(2*M)$ from the start of the helical windings of the outer helix. The inner helix may operate at a frequency greater than twice that of the outer helix.

In one embodiment, which is particularly useful for LEO satellite communications, both inner and outer helix have four helical coils. The coils may be wound on a cylindrical form or they may be wound with increasing, decreasing or both, diameters to increase bandwidth. Each of the four coils of the outer element are fed at very high frequency (VIH) at phase angles of 0, 90, 180 and 270 degrees, respectively. Each of the four coils of the inner element are similarly fed at ultra high frequency (UHF) at phase angles of 0, 90, 180 and 270 degrees, respectively. The windings of the inner helix are "clocked" 45 degrees from the windings of the outer helix. All helical elements are preferably wound in the same direction so that they have the same polarization. The pitch, diameter, and length of the helixes are chosen so that the antenna radiates in the conical mode. The helical elements may be air wound spring coils, compressed flat prior to launch and deployed to fall length in flight. The elements may alternatively be attached to any non-conducting material form that allows stowage and deployment.

Another embodiment features helically wound tape disposed on inflatable, non-conducting supports and concentrically positioned. The non-conducting supports are inflated in space to form the concentric helical antenna elements.

In another embodiment, three helices are mounted concentrically and each helix is operated at a different frequency. Two inner helices may be disposed end-to-end, concentrically within an outer helix, the third inner helix being positioned at the free end of the second, inner helix. Alternatively, the third inner helix may be positioned concentrically within the second inner helix.

An appreciation of other aims and objectives of the present invention may be achieved by studying the following description of preferred and alternative embodiments and by referring to the accompanying drawings.

A BRIEF DESCRIPTION OF THE DRAWINGS

FIG. 7C is a schematic drawing of an alternative embodiment of the Multi-Band Concentric Helical Antenna in which the helices are made from conducting tape disposed on a form which is inflated to the operating configuration upon deployment in space.

Figure 8:
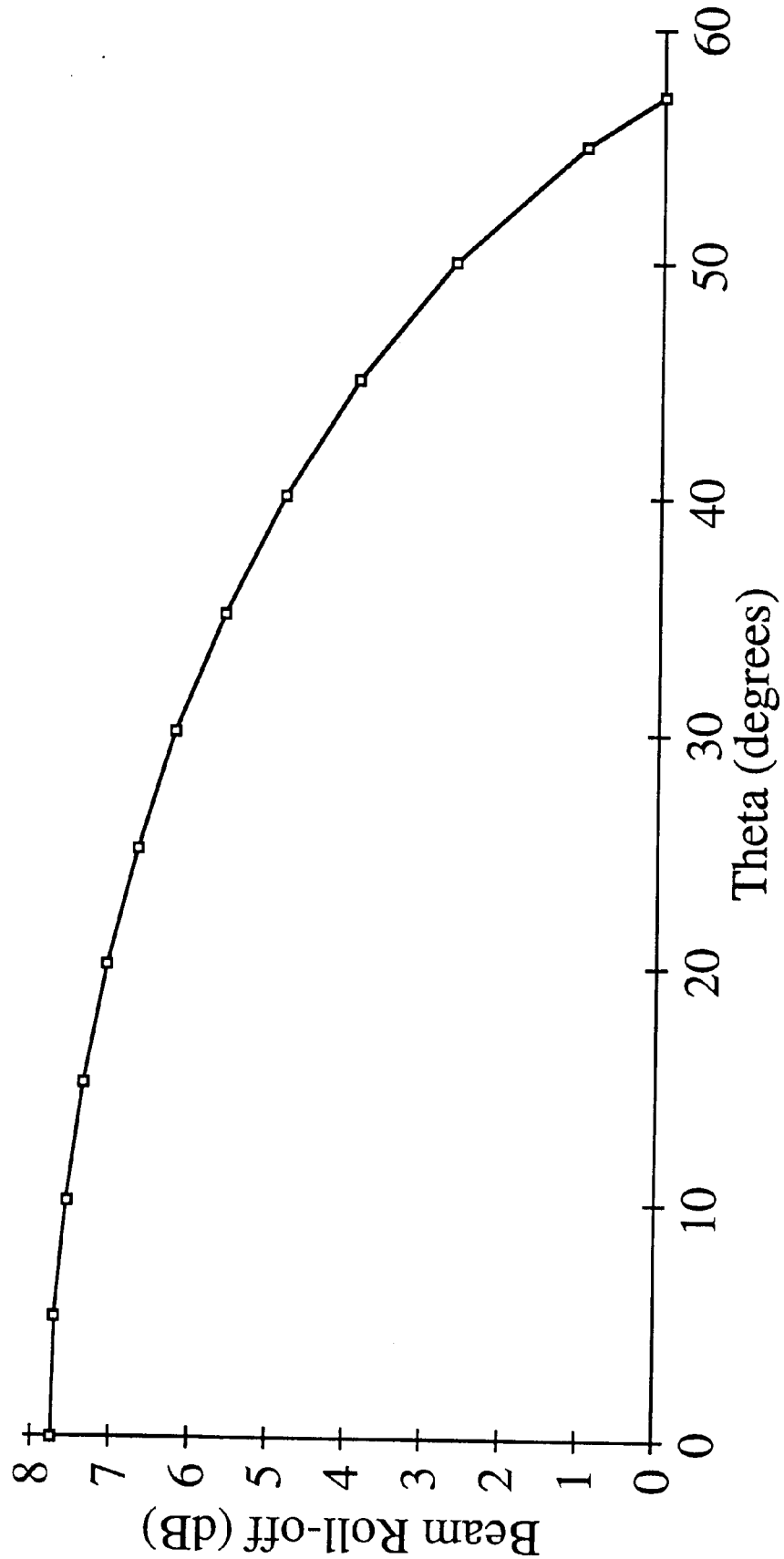

FIG. 8 is a chart depicting a typical roll-off of gain for an "isoflux" beam transmitted or received by a satellite antenna in low Earth orbit of 950 km altitude. Gain is shown from the nadir relative to an angle of 57.2 degrees from the nadir. The gain is based on the square of the distance between the satellite and a point in the beam footprint.

Figure 9:
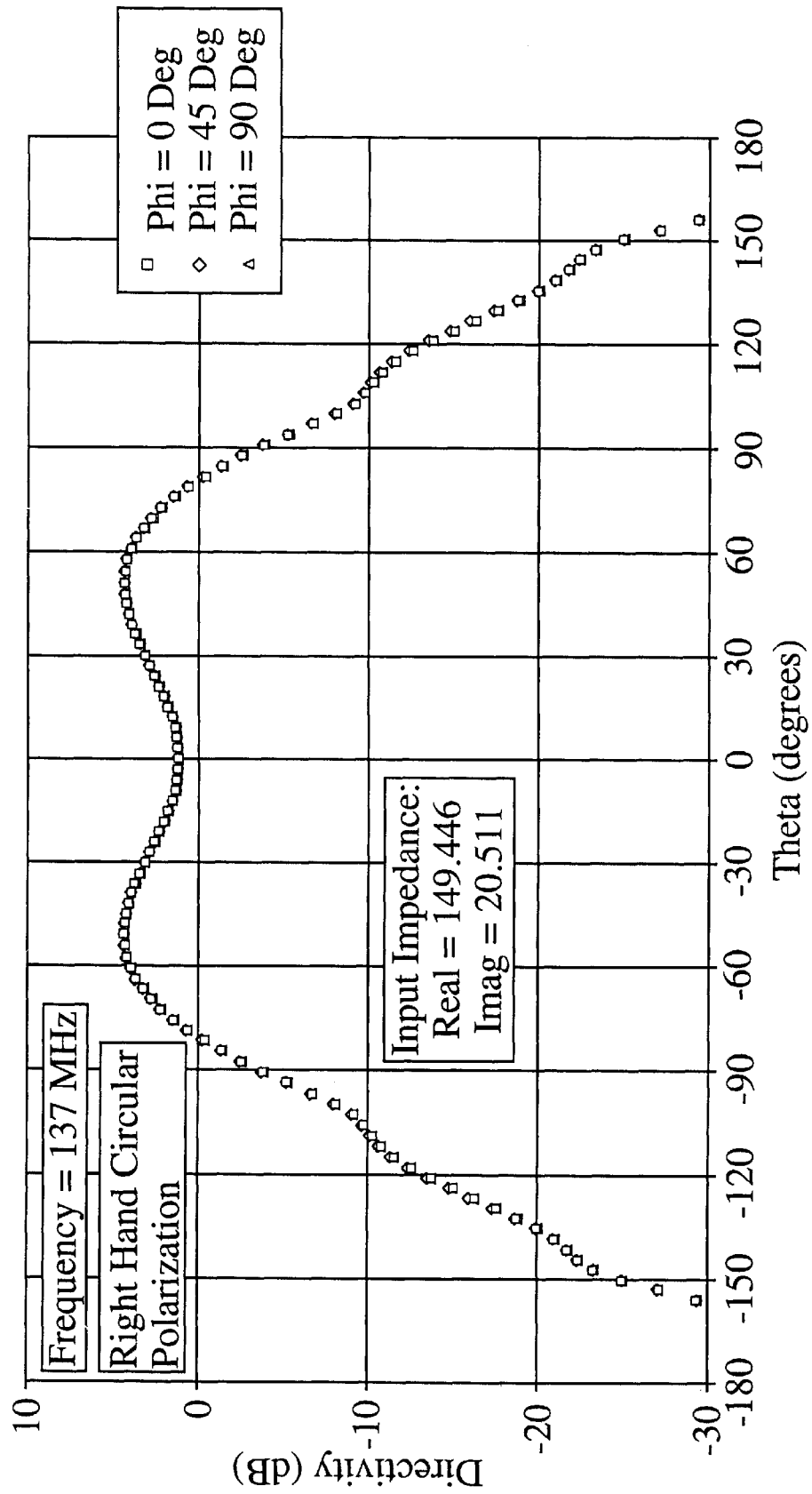

FIG. 9 is a chart on which is plotted directivity (no-loss gain) versus angle θ (angle from helix axis) of a single, quadrifilar, helical antenna, operating in conical mode, excited at a frequency of 137 MHz, at 0, 90, 180 and 270 degree phase angles.

Figure 10:
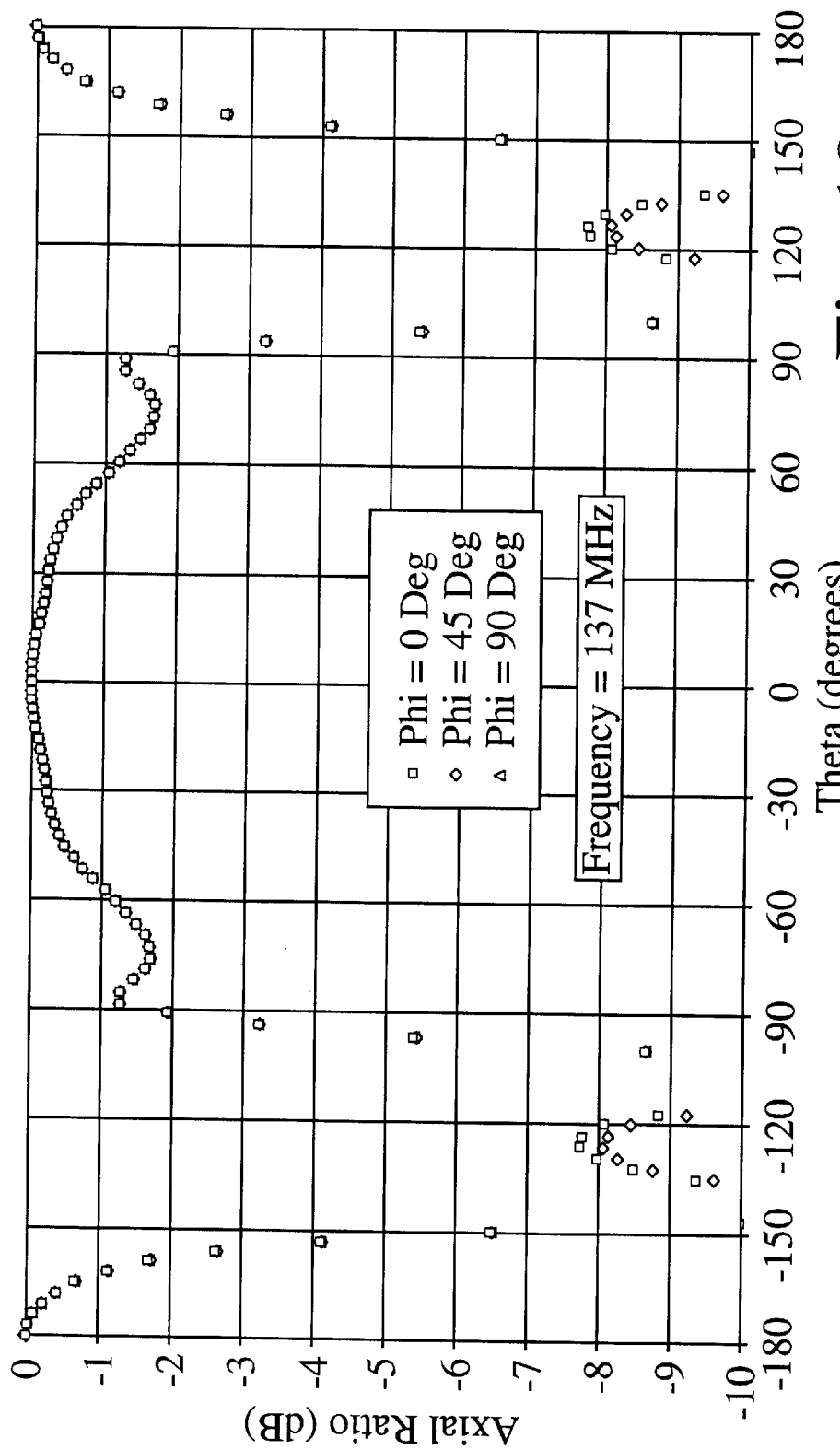

FIG. 10 depicts the Axial Ratio versus angle θ for a single quadrifilar helix, excited at a frequency of 137 MHz and fed at phase angles of 0, 90, 180 and 270 degrees; showing ratios near 0 dB which yield the best performance for a satellite-to-ground antenna.

Figure 11:
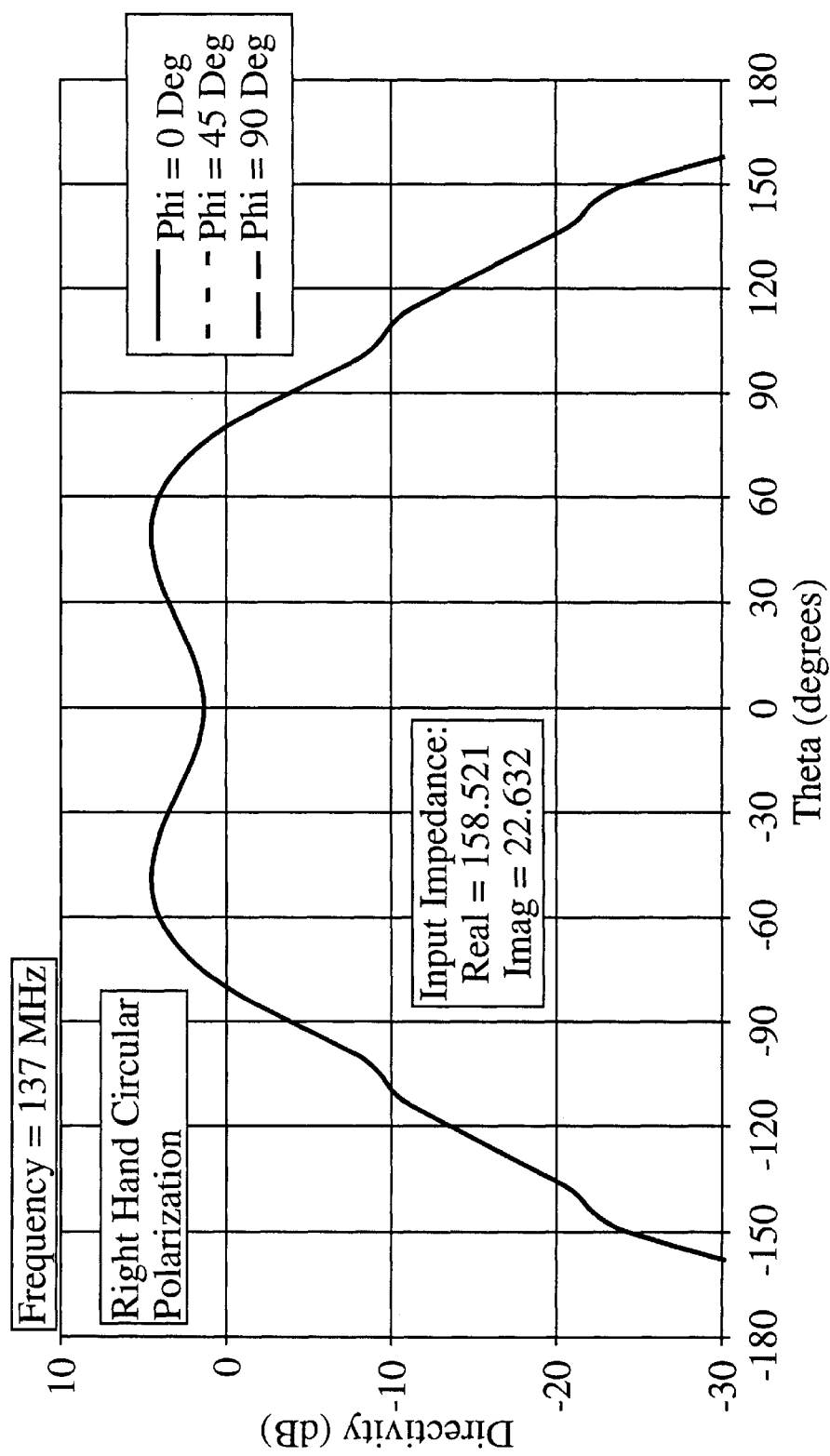

FIG. 11 is a plot of directivity versus angle from the helix axis θ for a Multi-Band Concentric Helical Antenna comprising two concentric quadrifilar helices. The outer helix is excited at a frequency of 137 MHz, at 0, 90, 180 and 270 degree phase angles. The outer helix is wound in a right-hand direction and the inner helix is also wound in a right-hand direction.

Figure 12:
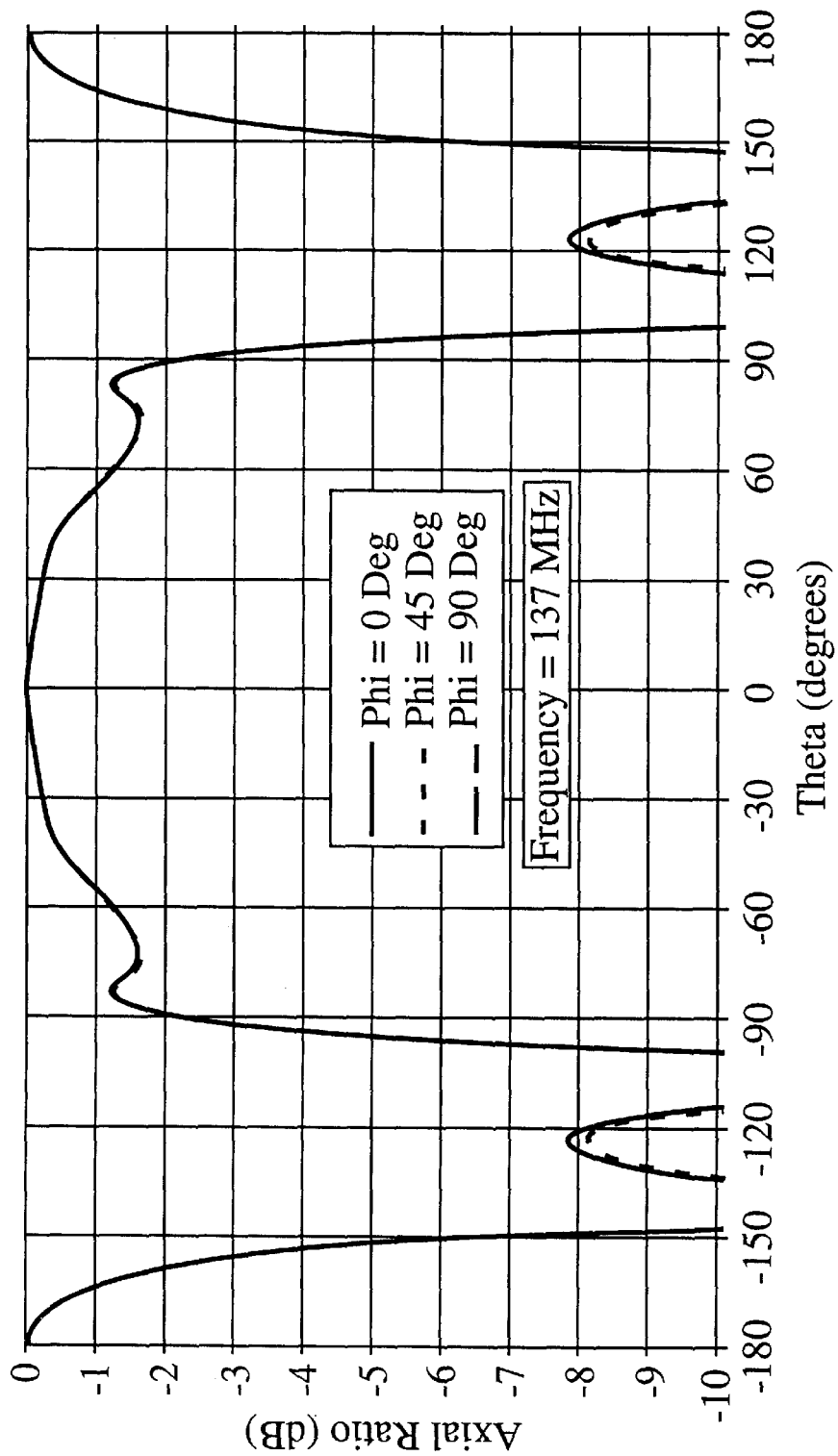

FIG. 12 displays the Axial Ratio versus angle θ for a Multi-Band Concentric Helical Antenna comprising two concentric quadrifilar helices, wound in the same direction, with the outer helix excited, as in FIG. 11.

Figure 13:
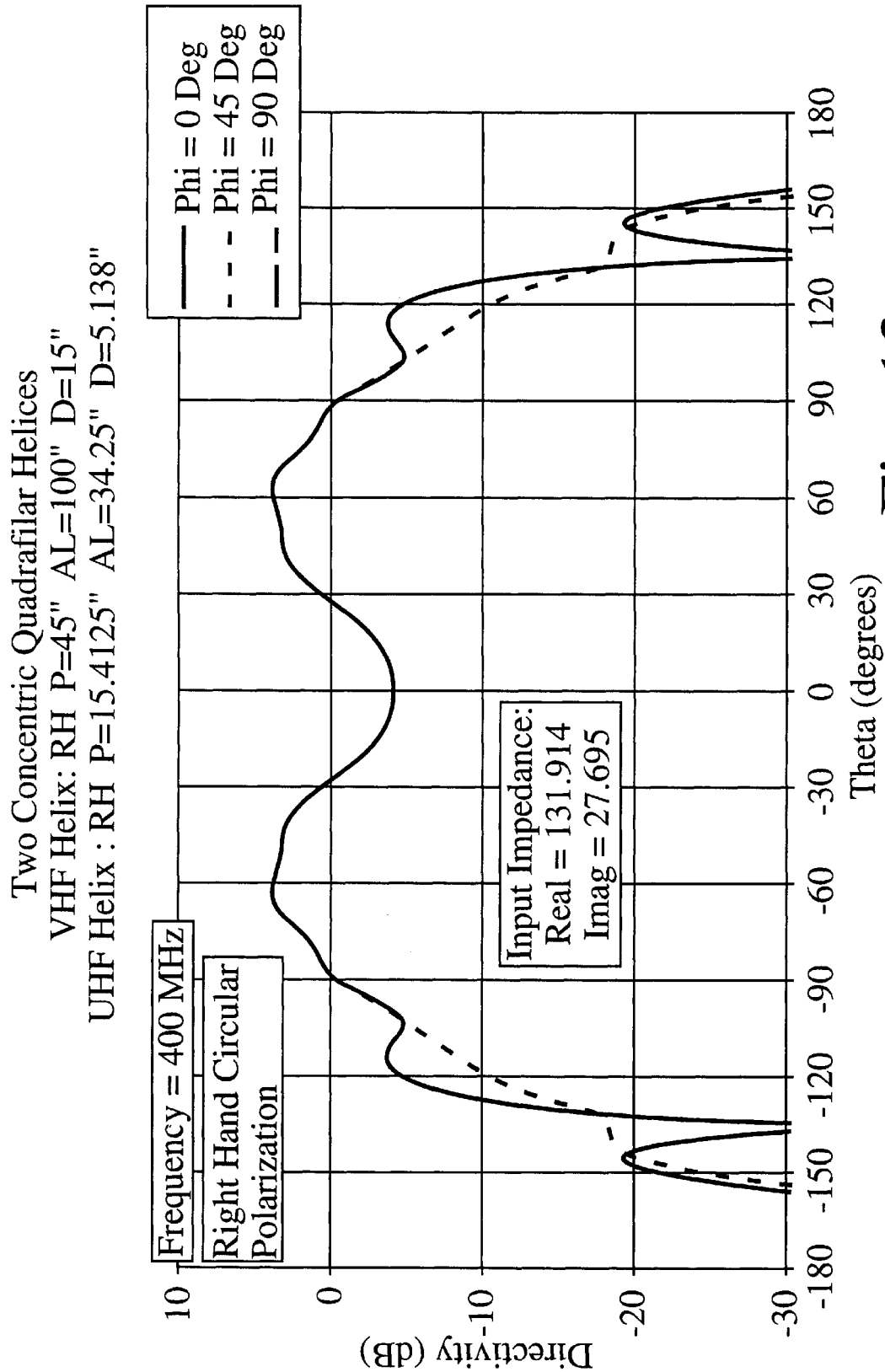

FIG. 13 is a plot, to be compared with FIGS. 9 and 11, of directivity versus angle from the helix axis θ of the Multi-Band Concentric Helical Antenna comprising two concentric quadrifilar helices wound in the same direction. The inner helix is excited at a frequency of 400 MHz, at 0, 90, 180 and 270 degree phase angles. The outer helical elements are terminated in 50 ohm loads.

Figure 14:
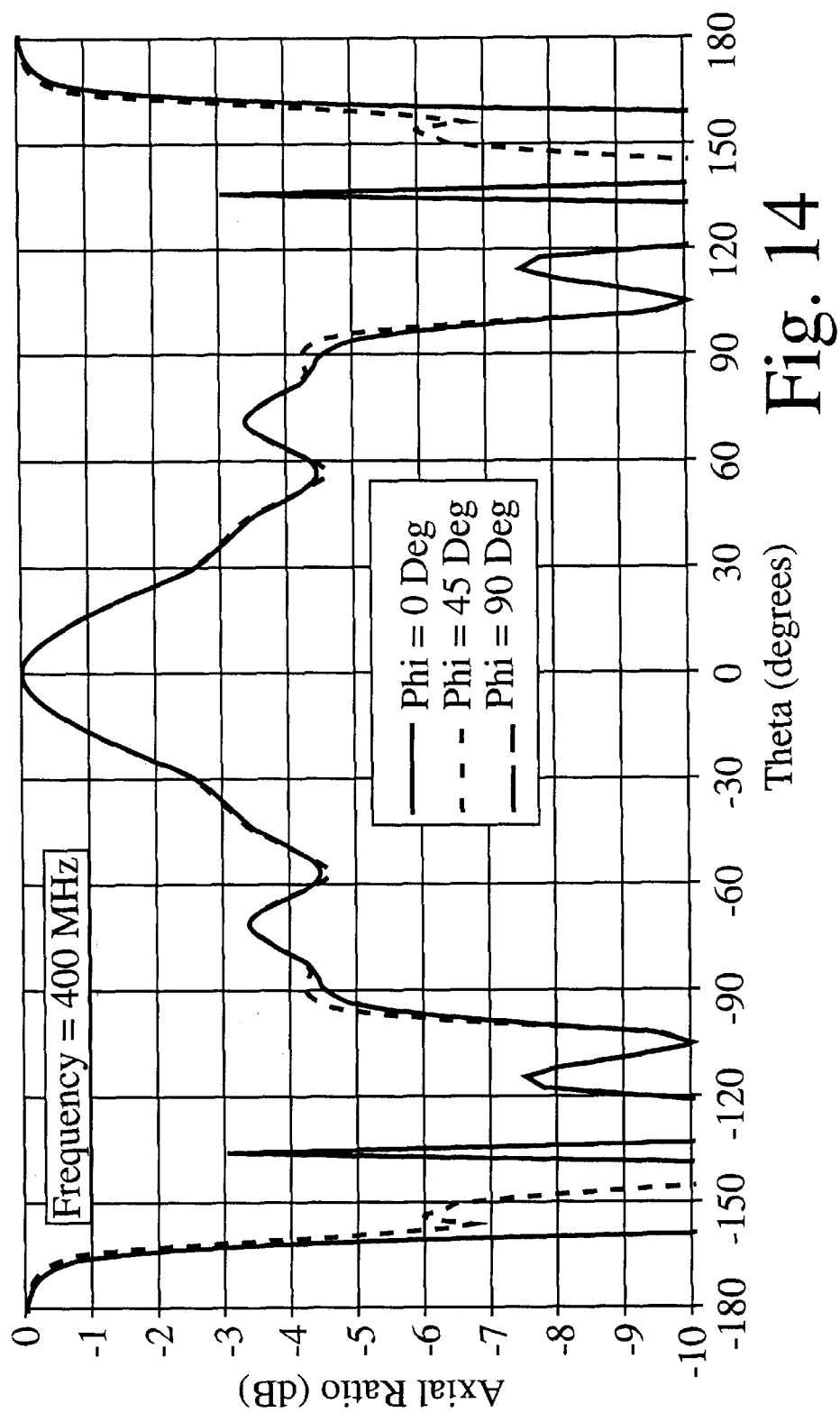
Figure 18:
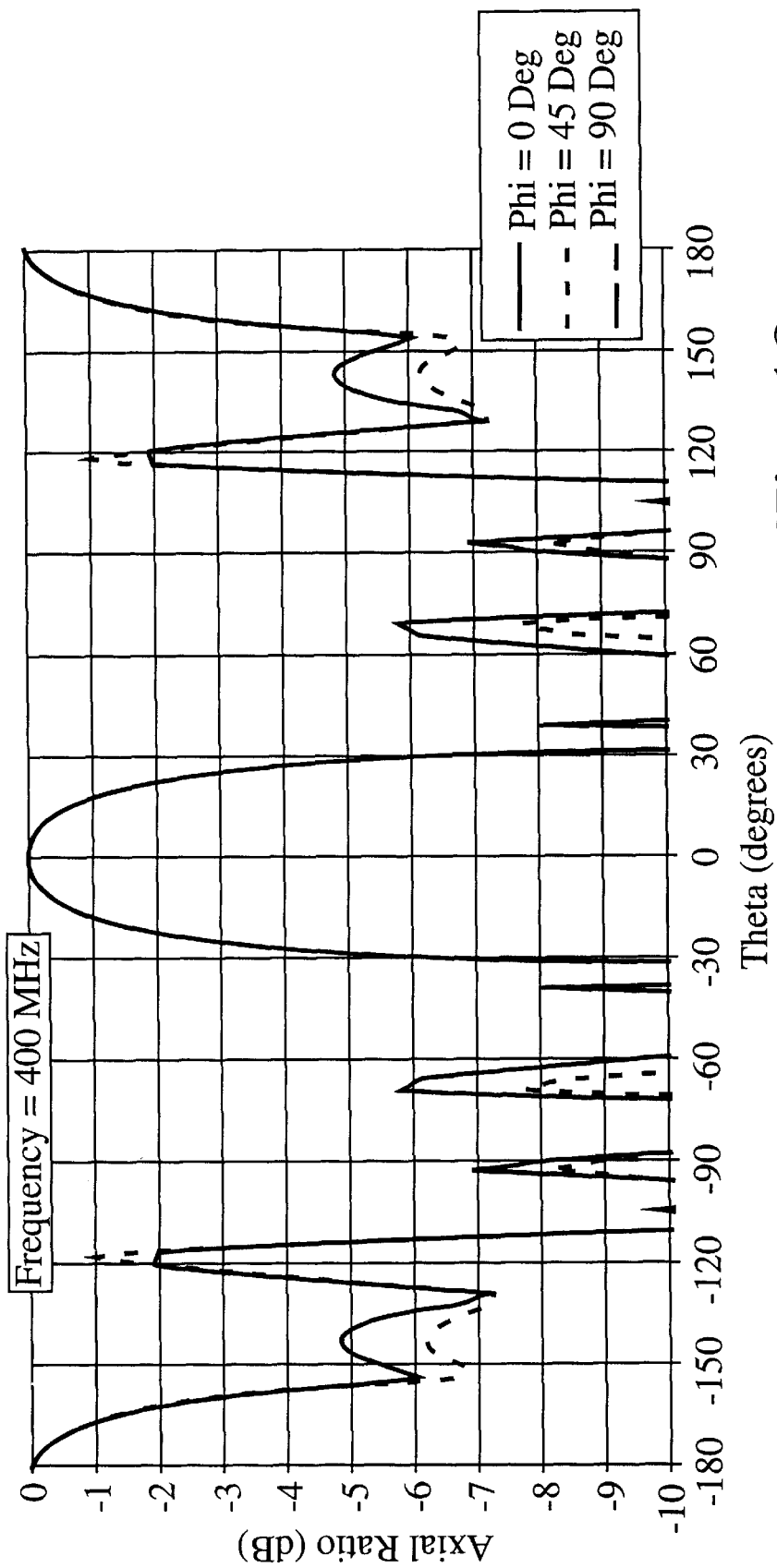

FIG. 14, to be compared with FIGS. 10 and 18, depicts the Axial Ratio at angles of θ for a Multi-Band Concentric Helical Antenna comprising two concentric quadrifilar helices, wound in the same direction, the inner helix excited as in FIG. 13. It shows the satisfactory Axial Ratio for the inner helix when it is wound in the same direction as the outer helix.

Figure 15:
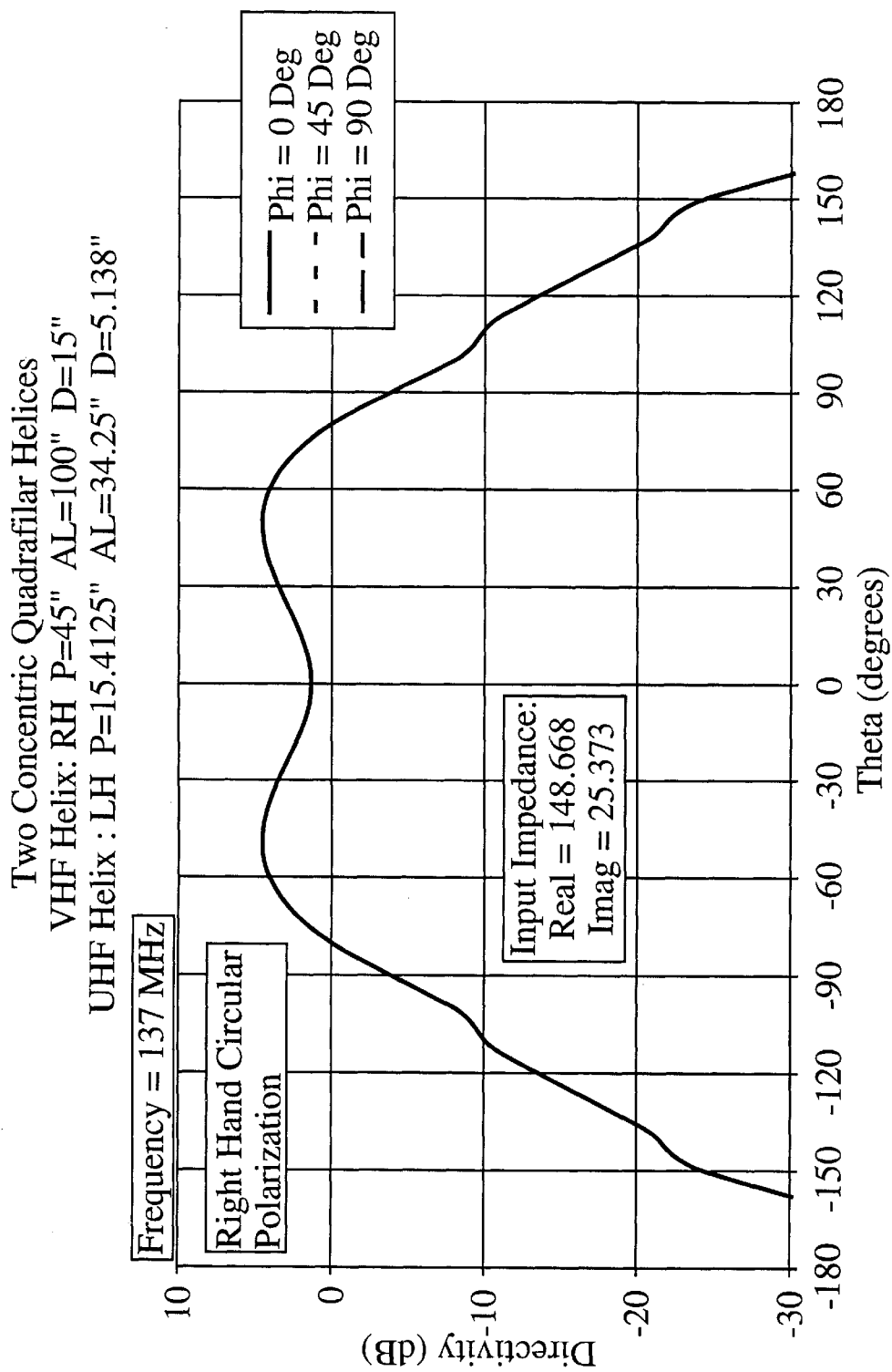

FIG. 15 is a plot, to be compared with FIGS. 9 and 11, of directivity versus angle from the helix axis θ for a Multi-Band Concentric Helical Antenna comprising two concentric quadrifilar helices dimensionally the same as in FIG. 11 and similarly excited. In this configuration, the outer helix is wound in a right-hand direction and the inner helix is wound in a left-hand direction.

Figure 16:
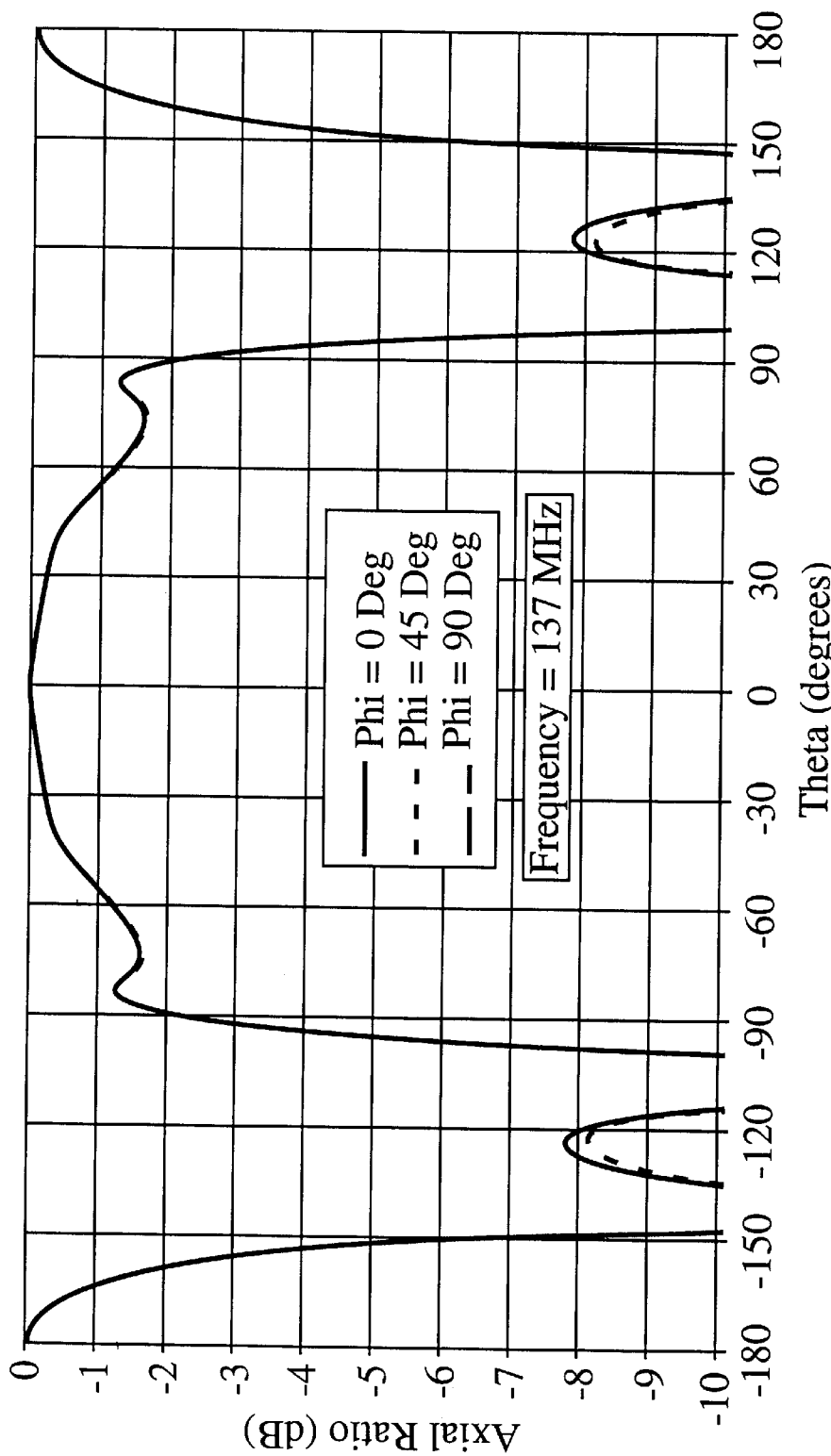

FIG. 16 shows Axial Ratio versus θ (angle from helix axis) for a Multi--Band Concentric Helical Antenna comprising two concentric quadrifilar helices, wound in opposite directions, dimensionally the same as in FIG. 11 and with the outer helix excited as in FIG. 11.

Figure 17:
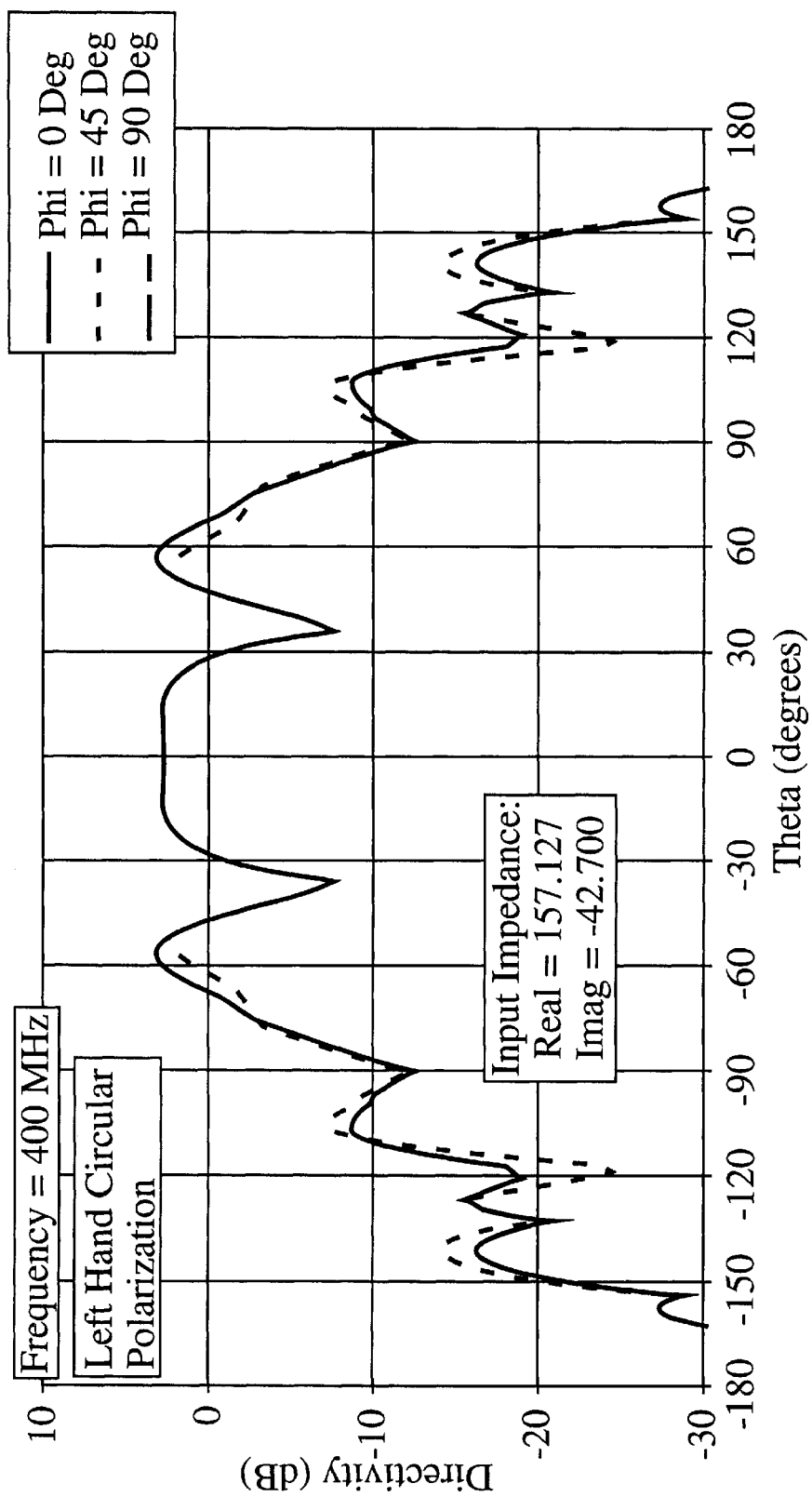

FIG. 17 is a plot of directivity versus θ for a Multi-Band Concentric Helical Antenna, comprising quadrifilar helical elements wound in opposite directions, in which the inner helix is excited at 400 MHz at 0, 90, 180 and 270 degrees phase angles and the outer helix is terminated with 50 ohm loads. This plot shows the inner helix does not work as desired when the helices are wound in opposite directions.

FIG. 18 reveals the Axial Ratio versus angle θ for a Multi-Band Concentric Helical Antenna comprising two concentric quadrifilar helices, wound in opposite directions, and the inner helix excited at 400 MHz, at 0, 90, 180 and 270 degrees phase angles and the outer helix terminated with 50 ohm loads. This figure shows the degradation in Axial Ratio for the inner helix when it is wound opposite to the outer helix.

Figure 19:
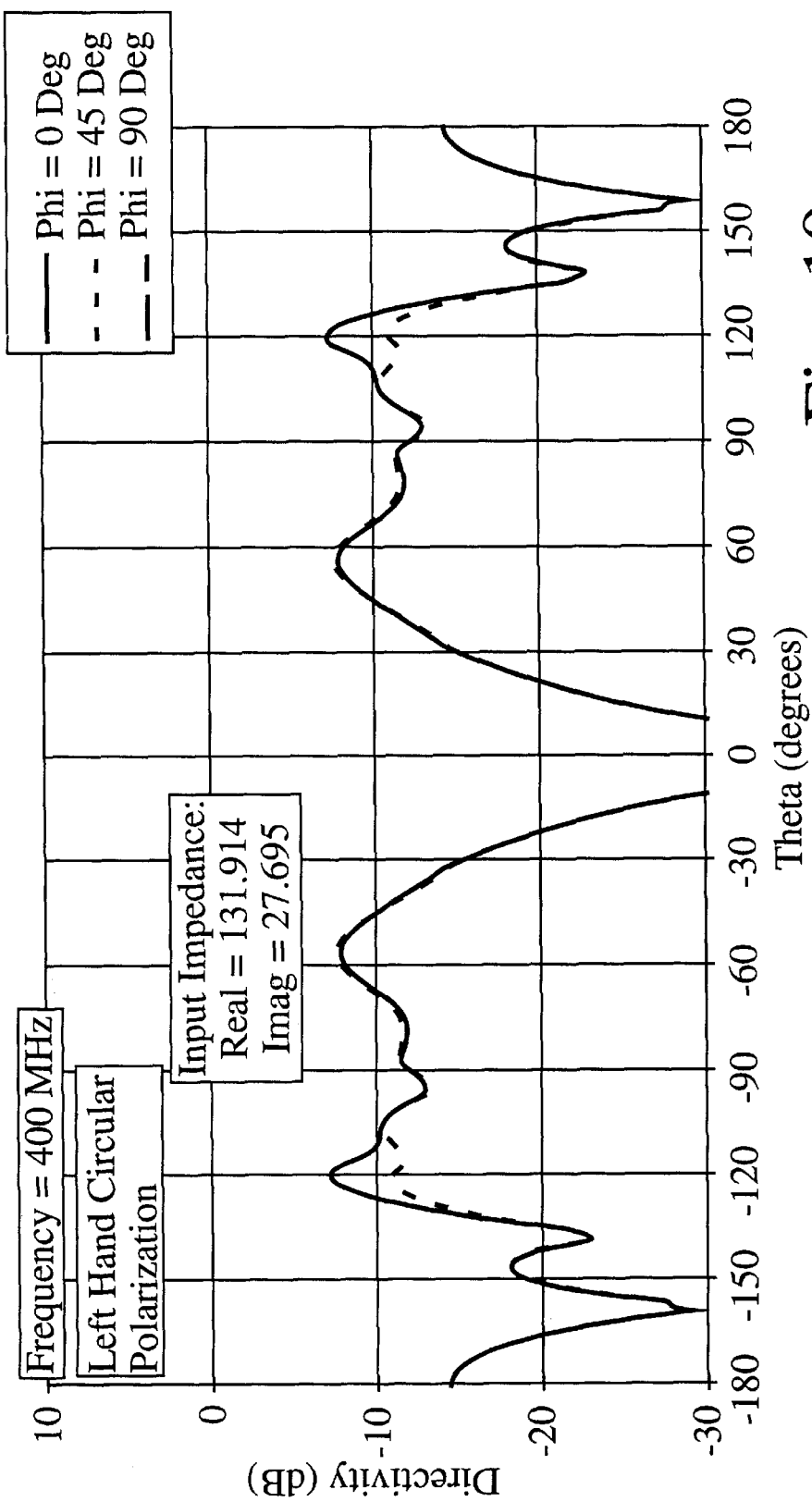

FIG. 19 is a plot of cross polarization versus θ for a Multi-Band Concentric Helical Antenna in which both helices are wound in the same direction, excited as in FIG. 17 at 400 MHz, showing significantly high cross polarization at 60 degrees off-axis.

Figure 20:
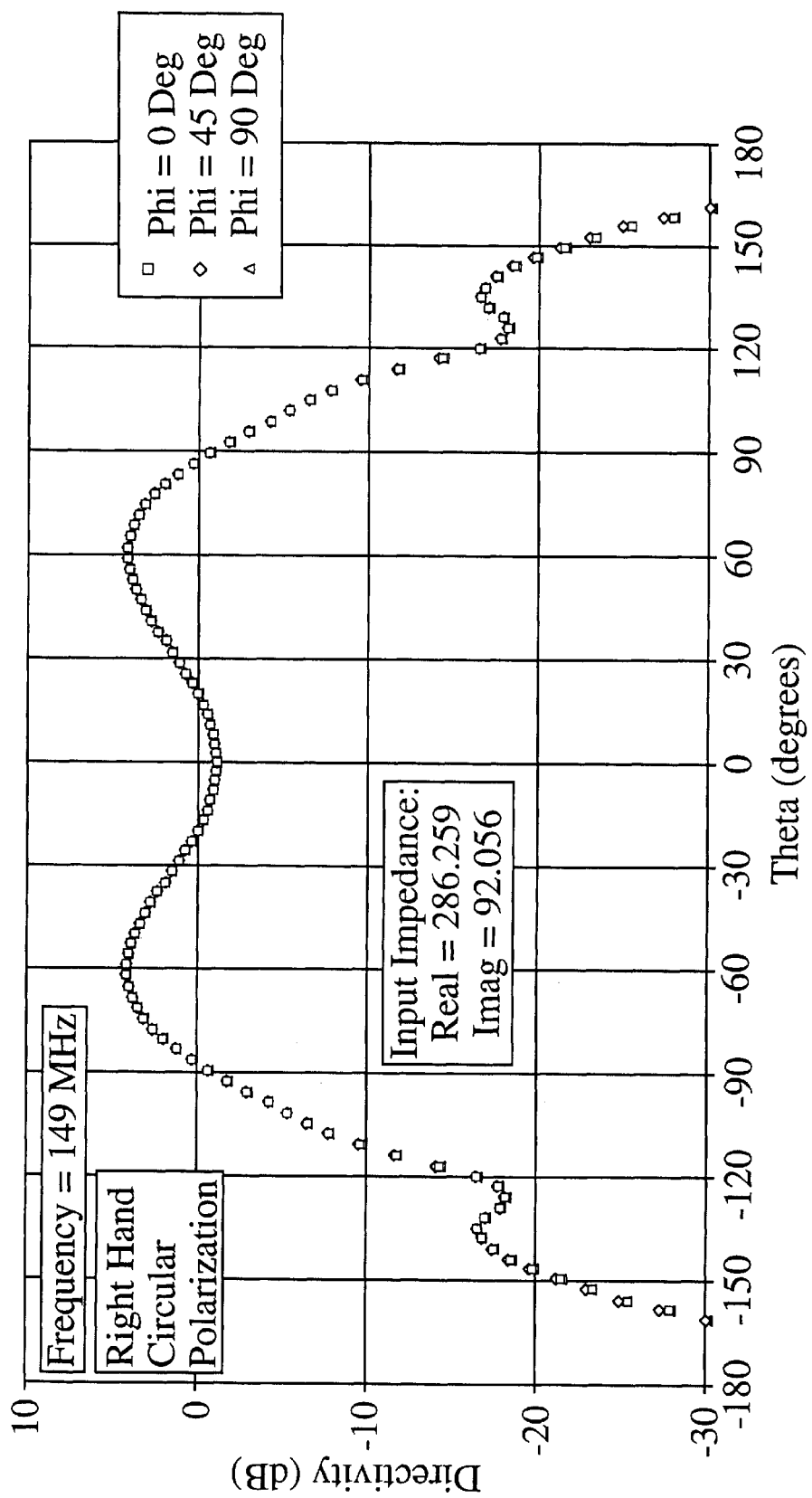

FIG. 20 is a chart on which is plotted directivity versus angle from the helix axis θ of a single, quadrifilar, helical antenna, excited at a frequency of 149 MHz at 0, 90, 180 and 270 degree phase angles.

Figure 21:
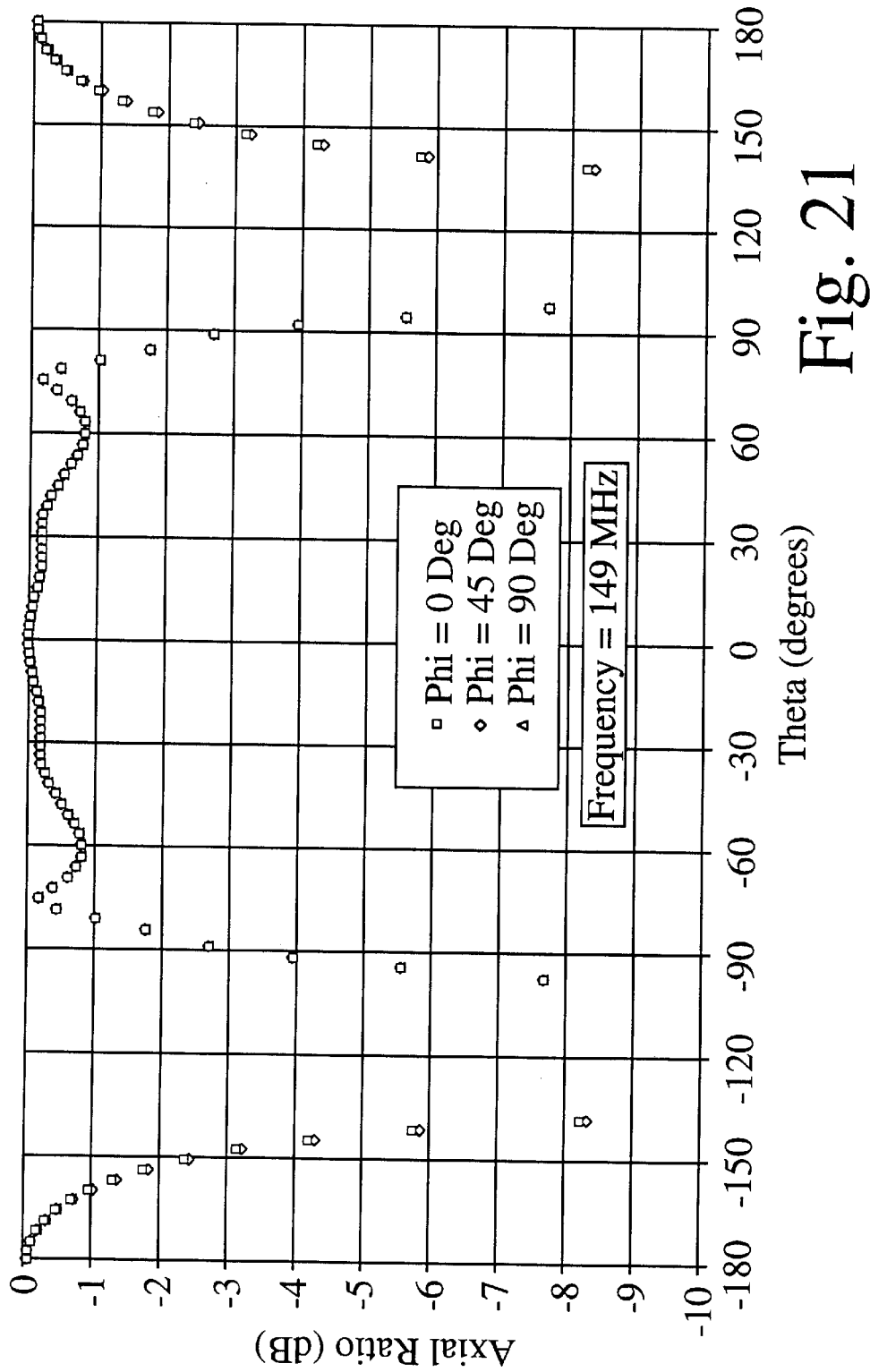

FIG. 21 is the Axial Ratio versus θ for a single, quadrifilar helix, excited at a frequency of 149 MHz at 0, 90, 180 and 270 degrees phase angles.

Figure 22:
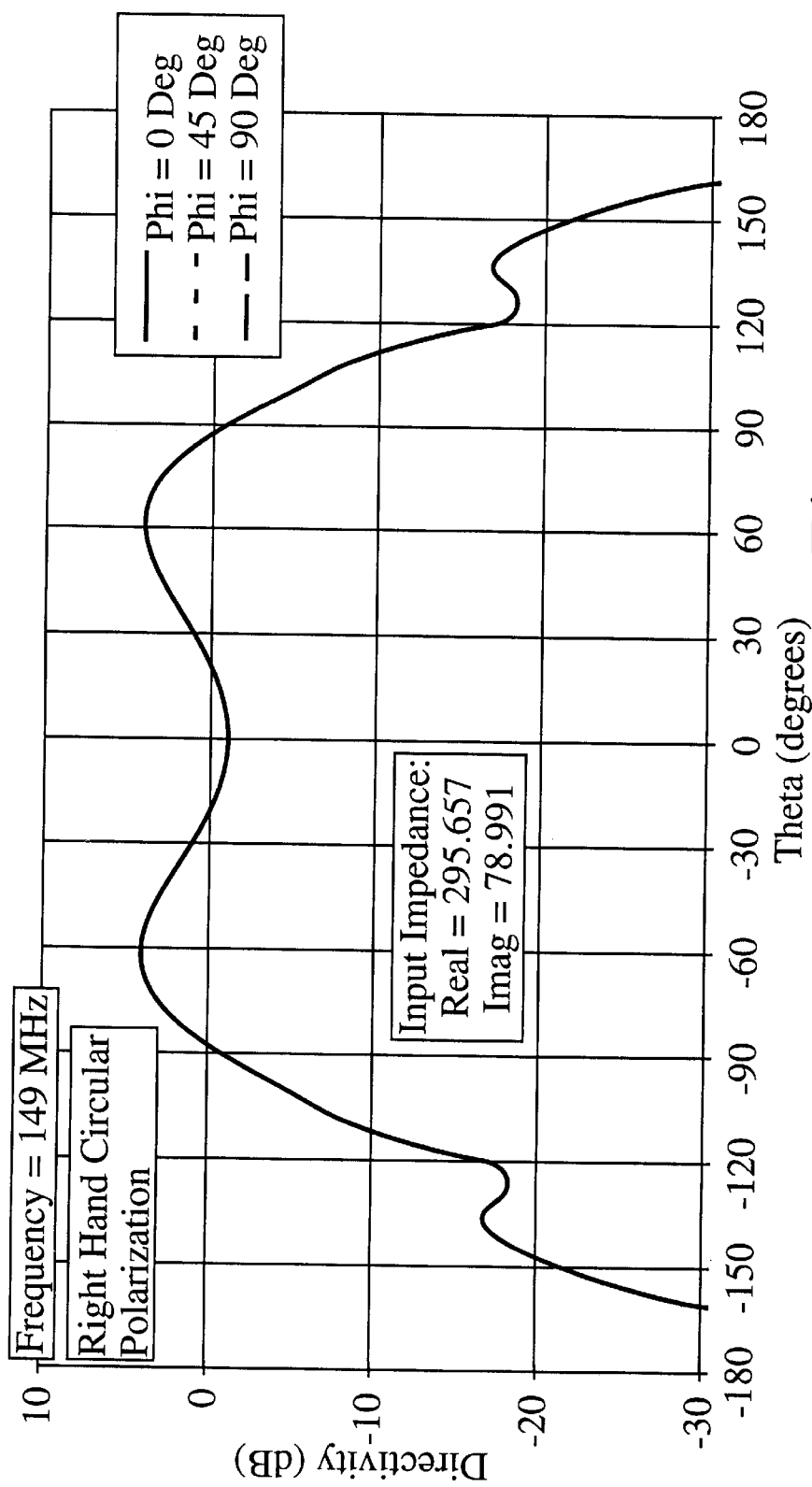

FIG. 22 is a plot, to be compared with FIG. 20, of directivity versus angle from the helix axis θ for a Multi-Band Concentric Helical Antenna comprising two concentric quadrifilar helices wound in opposite directions. The outer helix is excited at a frequency of 149 MHz, at 0, 90, 180 and 270 degree phase angles and the inner helix is terminated with 50 ohm loads.

Figure 23:
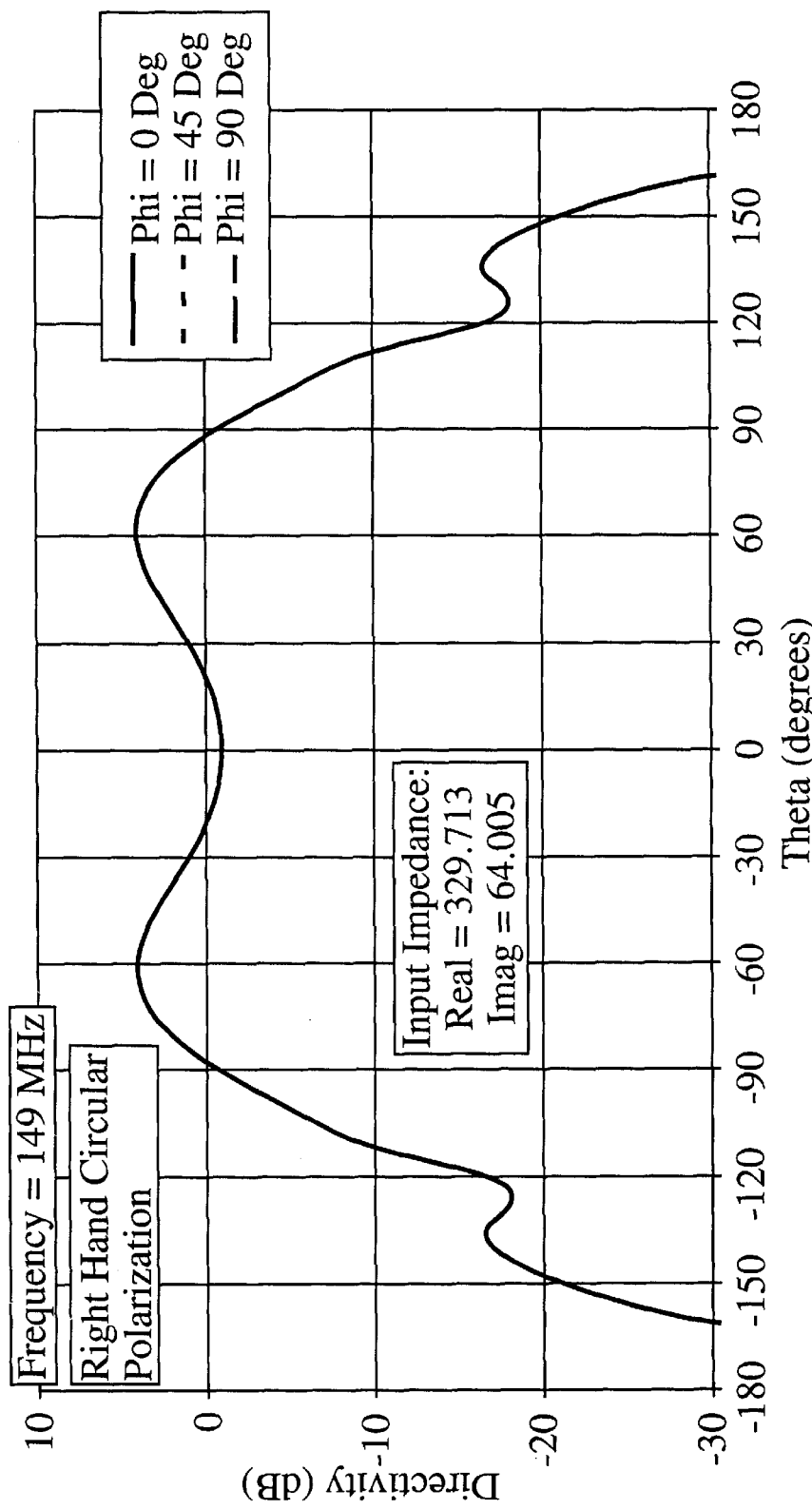

FIG. 23 is a plot, to be compared with FIGS. 20 and 22, of directivity versus angle from the helix axis θ for a Multi-Band Concentric Helical Antenna comprising two concentric quadrifilar helices wound in the same direction and similarly excited as in FIG. 22. The inner helix is terminated with 50 ohm loads.

Figure 24:
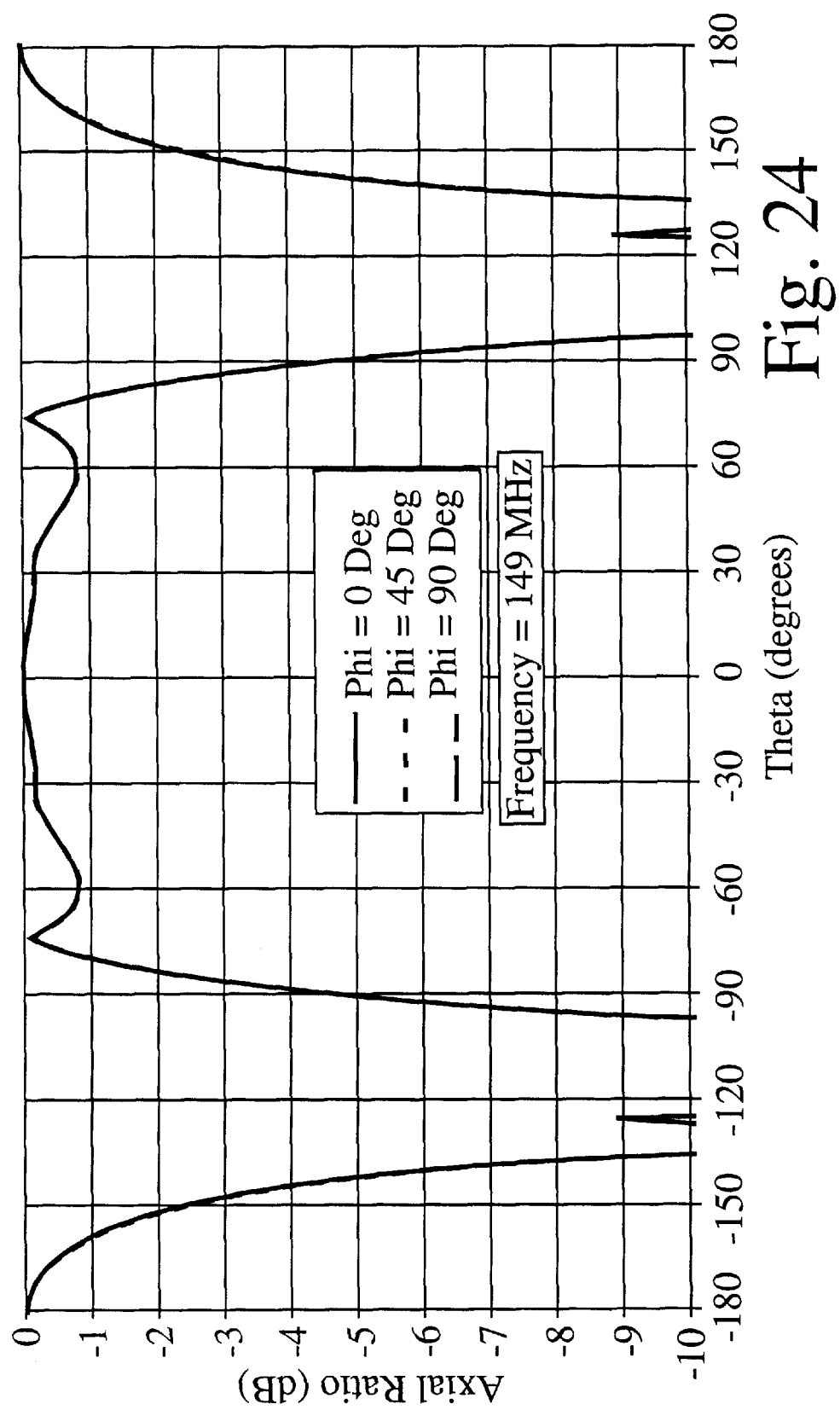

FIG. 24, to be compared with FIG. 21, reveals the Axial Ratio versus angle θ for a Multi-Band Concentric Helical Antenna, in which the outer helix is excited at 149 MHz at 0, 90, 180 and 270 degrees phase angles, and in which both helices are wound in the same direction.

A DETAILED DESCRIPTION OF PREFERRED & ALTERNATIVE EMBODIMENTS

Figure 1:
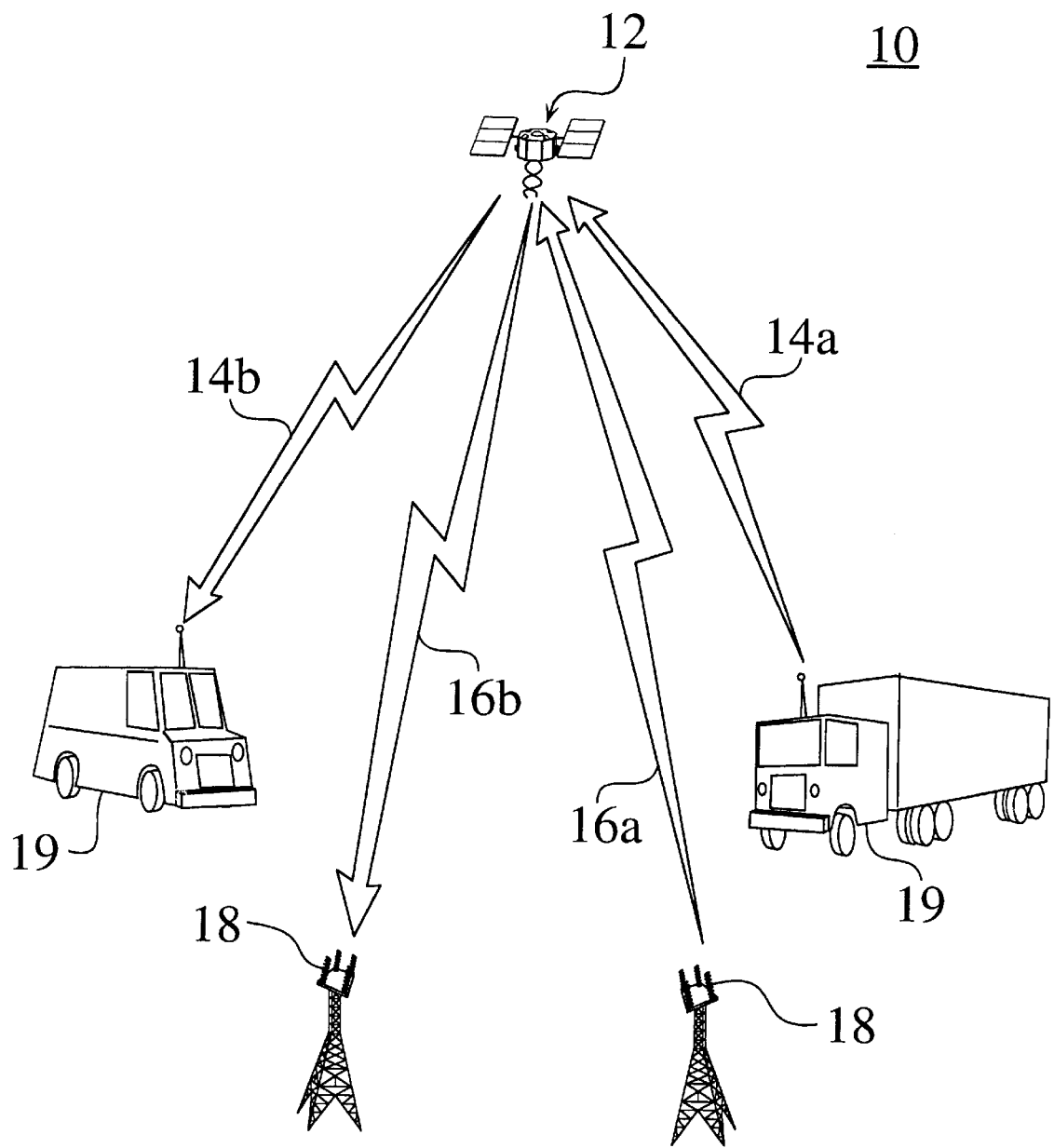
FIG. 1 is a schematic view of satellite communications using one of the preferred embodiments of the Multi-Band Concentric Helical Antenna.

FIG. 1 is a schematic view of a satellite communications system which uses a Multi-Band Concentric Helical Antenna of the present invention. The invention may be utilized with any type of satellite system operating at any altitude. The satellite 12, may for example, be operating in the non-voice, non-geosynchronous, Mobile Satellite Service. In this service, satellites may typically communicate with user terminals 19 on an uplink 14a frequency in the 148.000 to 150.050 MHz band and a downlink 14b frequency in the 137.000 to 138.000 MHz band. For better use of radio spectrum, it may be desirable that the satellite communicate with relay or gateway stations 18 on an uplink 16a frequency in the 399.900 to 400.050 MHz band and a downlink 16b frequency in the 400.150 to 401.000 MHz band. Under such conditions, the compact, Multi-Band Concentric Helical Antenna of the present invention offers a significant commercial advantage over currently available antennas. The reader should understand that the use of these frequency bands and the terms "VHF" and "UHT" as examples in the description of the following embodiments is illustrative of their operation and is not intended to limit the frequencies at which the invention may be used. The invention is intended to be independent of the exact frequencies, lengths, diameters, and pitch dimensions used in the examples.

Figure 1A:
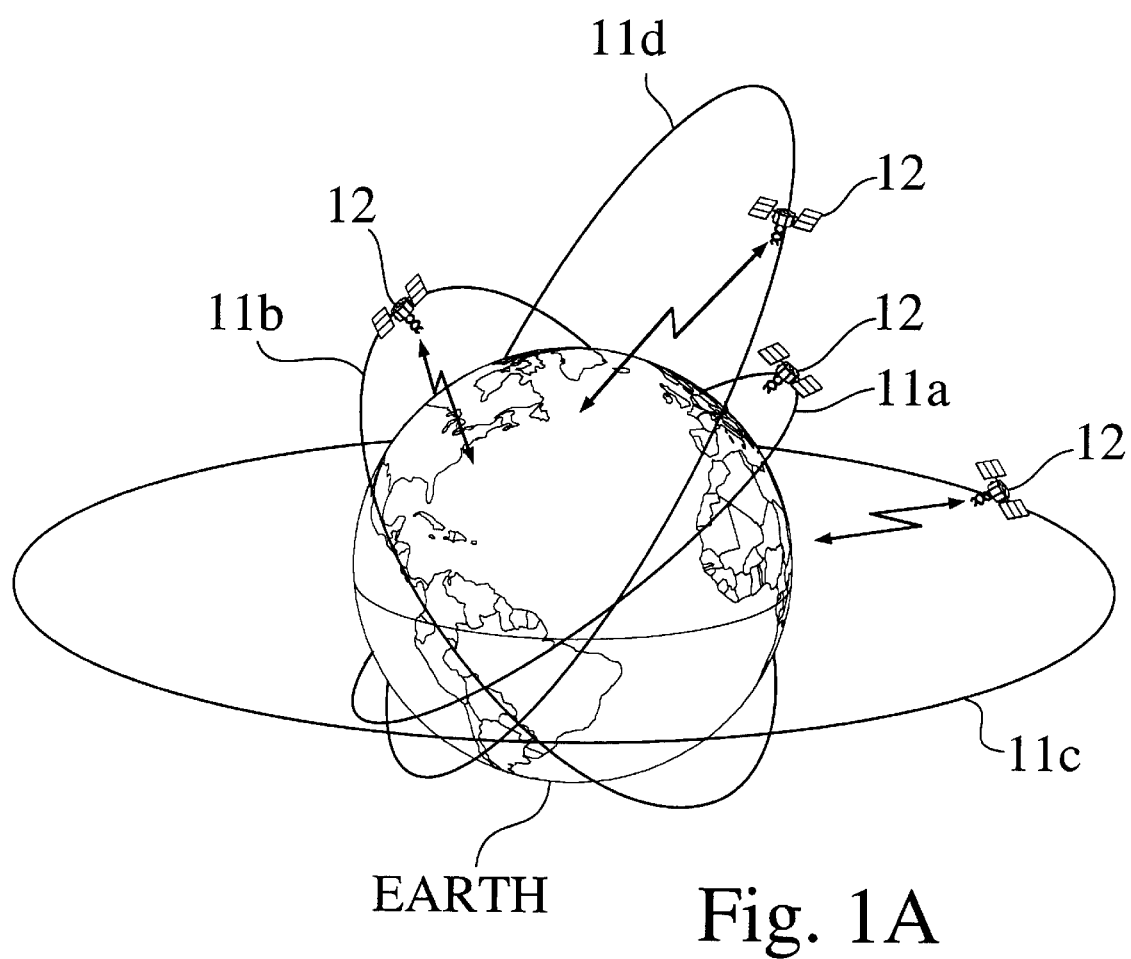
FIG. 1A is a schematic diagram depicting the use of the Multi-Band Concentric Helical Antenna for communication between Earth stations and satellites in a low Earth orbit, a medium Earth orbit, a highly elliptical orbit and a geostationary orbit.

FIG. 1A is a schematic diagram depicting the use of the Multi-Band Concentric Helical Antenna for communication between Earth stations and satellites in a low Earth orbit (LEO), a medium Earth orbit (MEO), a highly elliptical orbit (HEO) and a geostationary orbit (GEO). While this Specification emphasizes the compact embodiment of the Multi-Band Concentric Helical Antenna which is carried aboard satellites, the invention is not limited to these applications. In addition to general use for the transmission and reception of signals, the invention may be used for satellite-to-ground, ground-to-satellite and intersatellite communications. Two-way communication between terrestrial stations and/or airborne stations is also facilitated by the Multi-Band Concentric Helical Antenna.

Figure 2:
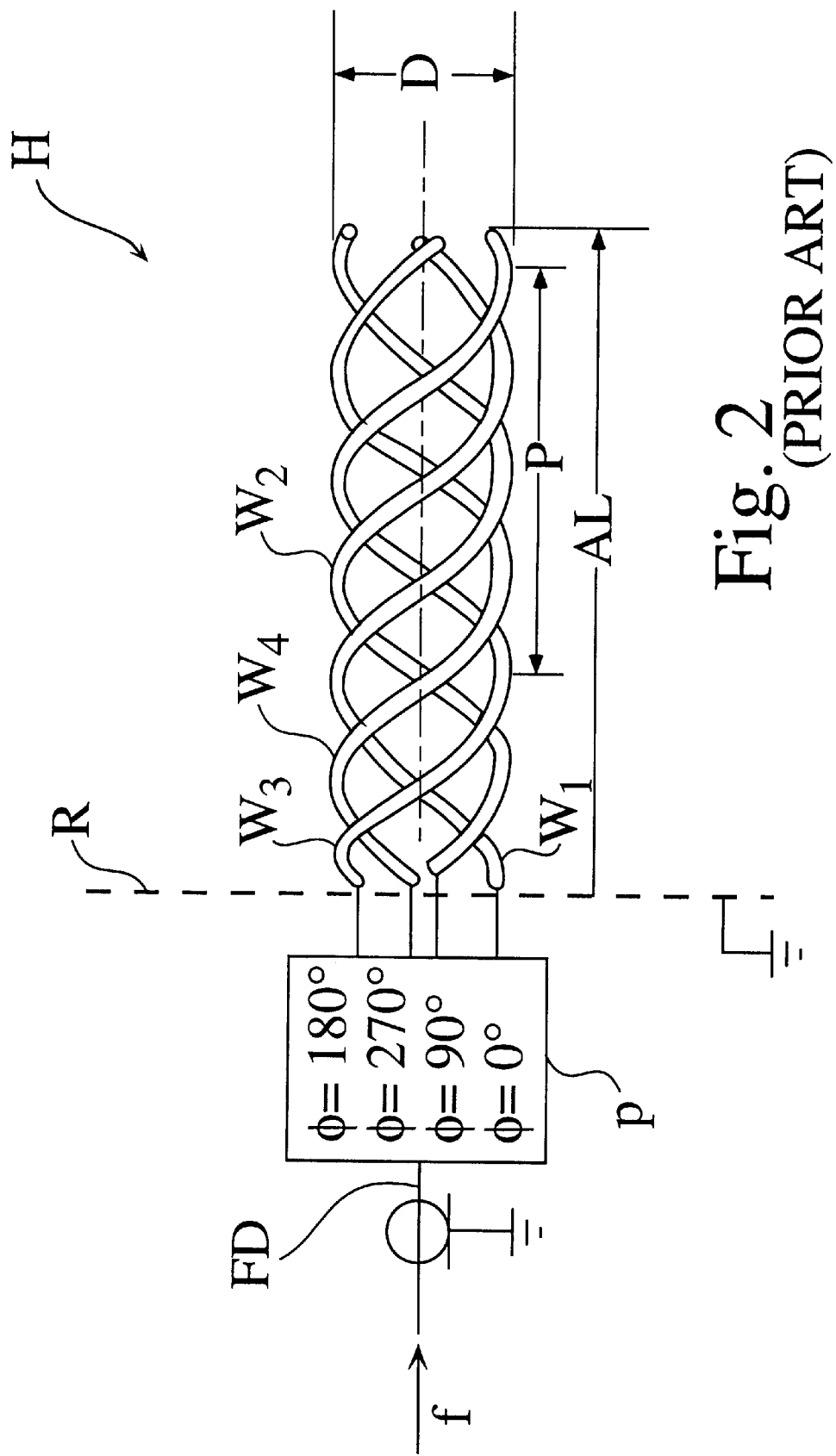
FIG. 2 is a schematic representation of a helical antenna, known in the art, comprising four helical elements.

FIG. 2 is a schematic representation of a helical antenna H known in the prior art, comprising four or "quadrifilar" helical elements. A reflector or ground plane R is positioned at the fed-end of the helix. The antenna has a length AL, a diameter D, and a pitch spacing P for each helical element. Each of the helical windings begins at a point rotated 90 degrees from the preceding winding. The antenna is fed at the starting end of the helical windings with radio frequency energy f from a feed line FD. A phase shifter p splits the energy f into four phase angles, $\phi=0$, 90, 180 and 270 degrees. Each phase is fed to a correspondingly phased winding $W_{1-4}$.

Figure 3:
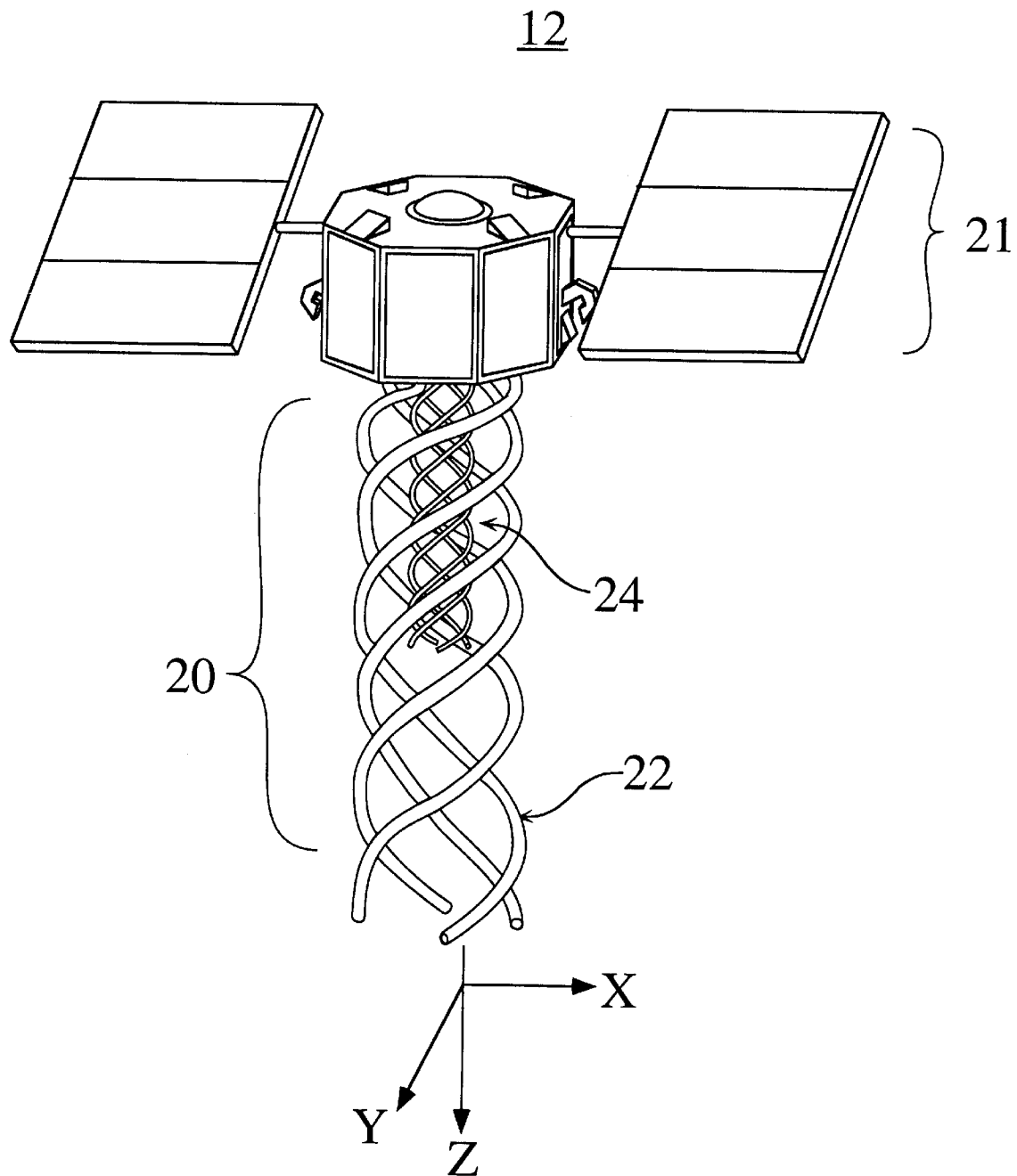
FIG. 3 is a perspective view of a low Earth orbit (LEO) satellite which utilizes one of the preferred embodiments of the Multi-Band Concentric Helical Antenna of the current invention.

FIG. 3 is a perspective view of a low Earth orbit (LEO) satellite 12, on the body 21 of which is mounted a Multi-Band Concentric Helical Antenna 20. On-board communications are powered by solar panels. An inner helix 24 is placed concentrically within a outer helix 22. As described below, both the inner and outer helix 22, 24 can operate in a novel conical mode when concentrically located.

Figure 4:
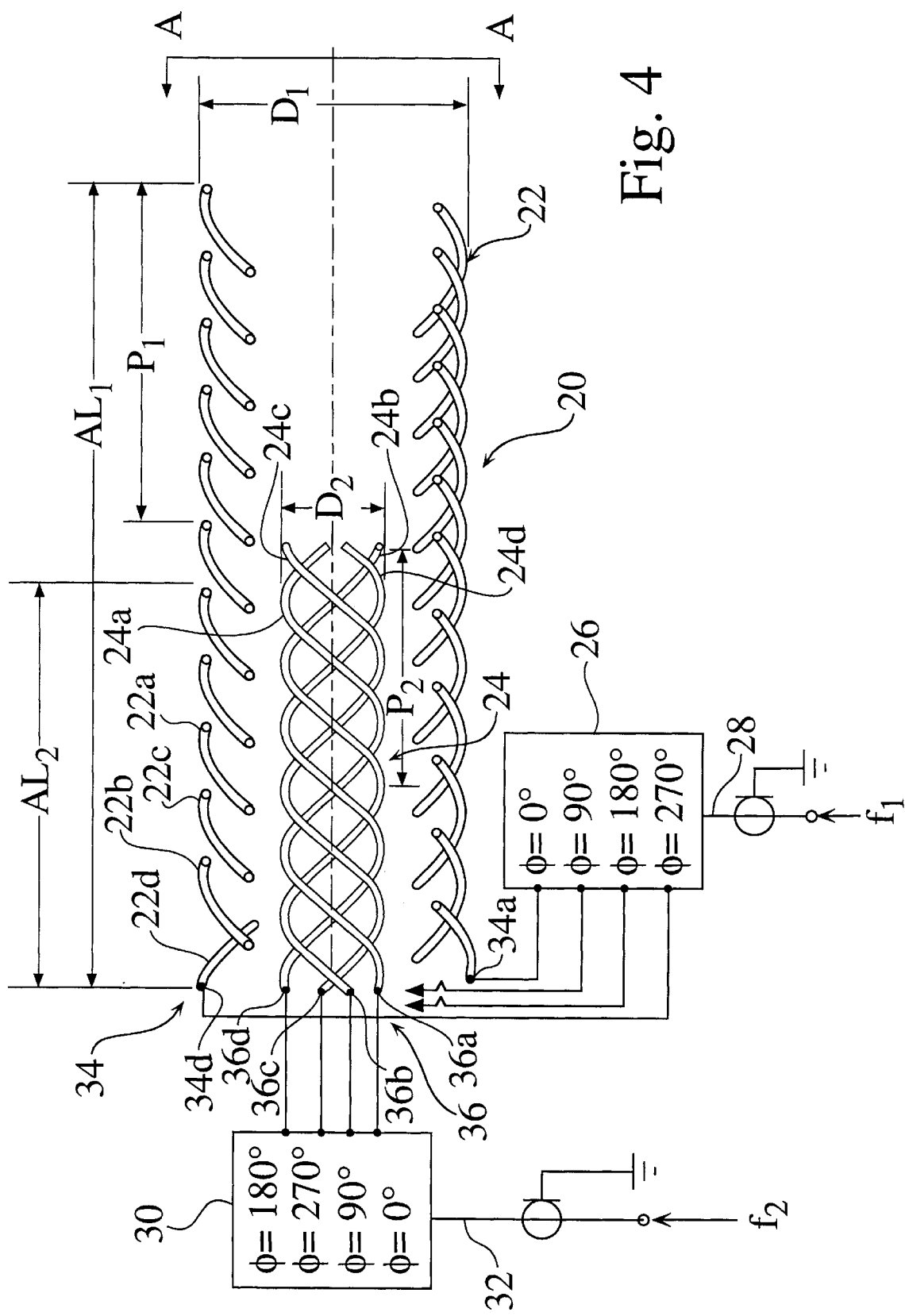
FIG. 4 is a schematic, cut-away diagram of a preferred embodiment of the Multi-Band Concentric Helical Antenna revealing cylindrically-wound, "quadrifilar" helical elements of outer and inner helices, and feedlines and phase shifters which deliver phase-shifted, radio frequency energy to each one of the quadrifilar helical elements.

A preferred embodiment of the Multi-Band Concentric Helical Antenna 20 is shown schematically in FIG. 4. The preferred number of helical elements (N) in the outer helix is a number equal to or greater than three. The start of the helical windings of all helical elements begins at the input end of the antenna 20. In the coordinate system (X, Y, Z) of the antenna shown in FIG. 3, the windings begin at Z=0. This is more clearly seen in FIG. 4. The N helical elements of the outer helix 22 are coupled at the start of their windings 34 through a phase shifter 26 to an antenna feed line 28 which supplies radio frequency energy $f_1$. The phase shifter 26 supplies energy to each of the N elements at phase angles $\phi$, determined according to Equation 1.

$\phi=(360°/N)*(i-1)$, where i equals 1, 2 ... N.   (Equation 1)

The preferred number of helical elements (M) in the inner helix 24 is also a number equal to or greater than three. The M helical elements of the inner helix 24 are connected to a second antenna feed line 32 through a second phase shifter 30. Energy is supplied to the inner helix 24 in the same manner as to the outer helix 22. The second phase shifter 30 supplies energy to each of the inner helix elements 24a–d at phase angles $\phi$, determined according to Equation 2. However, the start of the helical windings of the inner helix are "clocked," that is rotated about the helix axis, by an angle $\sigma$ from the start of the helical windings of the outer helix, which is determined by Equation 3.

$\phi=(360°/M)*(i-1)$, where i equals 1, 2 ... M.   (Equation 2)

$\sigma=360°/(2*M)$   (Equation 3)

The inner helix 24 may be operated at a frequency at least twice that of the outer helix 22.

Referring again to FIG. 4, an antenna, when used for LEO satellite communications, would likely operate in the Very High Frequency (VHF) and Ultra High Frequency (UH) bands. Therefore, this embodiment of the antenna 20 has an outer VHF helix 22 and an inner UHF helix 24.

There are four or "quadrifilar" helical elements 22a–d, 24a–d in each helix 22, 24. The helical elements in the embodiment depicted are cylindrically wound. They may, however, be wound with a decreasing diameter to increase bandwidth. The cylindrically-wound, "quadrifilar" helical elements 24a–d of the UHF helix 24 are concentric with and contained completely within the quadrifilar helical elements 22a–d of the VHF helix 22. Feedline 28 delivers VHF energy to each one of the VHF quadrifilar helical elements 22a–d through a phase shifter 26. Feedline 32 delivers UHF energy to each one of the UHF quadrifilar helical elements 24a–d through phase shifter 30.

The helix dimensions may be selected so that each helix radiates energy in a novel conical mode, in which mode radiation roll-off from the value at the helix axis may be made consistent with a desired pattern of the beam. For example, the pitch ($P_1$, $P_2$), diameter ($D_1$, $D_2$), and length ($AL_1$, $AL_2$) of the helices may be chosen so that the antenna (20) radiates with approximately equal flux at all points in a far-field plane. Any appropriate length, diameter and pitch dimension can be used so long as desired conical mode of operation results. When the far field lies on the Earth's surface it is called the beam footprint.

In one preferred embodiment, performance data for which is shown in FIGS. 11 through 19, 22, 23 and 24 the VHF helix 22 has a length $AL_1$ of about 100 inches, a diameter $D_1$ of about 15 inches, and a pitch spacing $P_1$ of about 45 inches. The UHF helix 24 has a length $AL_2$ of about 34.25 inches, a diameter $D_2$ of about 5.14 inches, and a pitch spacing $P_2$ of about 15.4 inches. In FIGS. 15–18 and 22, the quadrifilar helical elements 22a–d of the VHF helix 22 are wound in the opposite direction from the helical elements 24a–d of the UHF helix 24. In another embodiment, performance data for which is shown in FIGS. 12–14, 19, 23 and 24, the quadrifilar helical elements 22a–d of the VHF helix 22 are wound in the same direction as the elements 24a–d of the UHF helix 24. The length $AL_1$, $AL_2$, diameter $D_1$, $D_2$ and pitch spacing $P_1$, $P_2$ of the helices may be adjusted so that the antenna will radiate in a conical mode with a desired gain roll-off approximating that shown in FIG. 8.

To communicate at VHF with the embodiment shown in FIG. 4, a radio signal $f_1$ is fed to the starting ends 34a–d of the quadrifilar windings 22a–d of the VHF helix 22 from the antenna feed line 28 through the phase shifter 26. As determined from Equation 2, the phase shifter 26 has outputs at four phase angles: $\phi=0$, 90, 180 and 270 degrees which are radiated from the VHF helical windings 22a–d. To obtain performance data relating to the VHF helix 22, shown in FIGS. 11, 12, 15, 16 and 22–24, the quadrifilar windings 24a–d of the UHF helix are terminated in 50 ohm loads. This load is generally selected as a reference load because the characteristic impedance of commonly used antenna feed line is close to 50 ohms.

To communicate at UHF with the embodiment shown in FIG. 4, a signal $f_2$ is fed to the starting ends 36a–d of the quadrifilar windings 24a–d of the UHF helix 24 from an antenna feed line 32 through a phase shifter 30. The phase shifter 30 has outputs at four phase angles: φ=0, 90, 180 and 270 degrees which are radiated from the quadrifilar windings 24a–d. To obtain performance data shown in FIGS. 15, 16, 17, 21 and 22 relating to the UHF helix 24, the quadrifilar windings 22a–d of the VHF helix are terminated in 50 ohm loads.

For receiving VHF or UHF signals, of course, radiated energy is intercepted by the corresponding helix 22, 24 and passed through the appropriate phase shifter 26, 30 through the coupled antenna feed line 28, 32 to a receiver.

The performance of these embodiments may be compared to the performance of a single quadrifilar helix H, such as depicted in FIG. 2, excited at VHF at 0, 90, 180 and 270 degrees phase angles. Data for one configuration of this helix H, which has the same dimensions as the VHF helix 22 described above, are shown in FIGS. 9, 10, 20 and 21.

Figure 5:
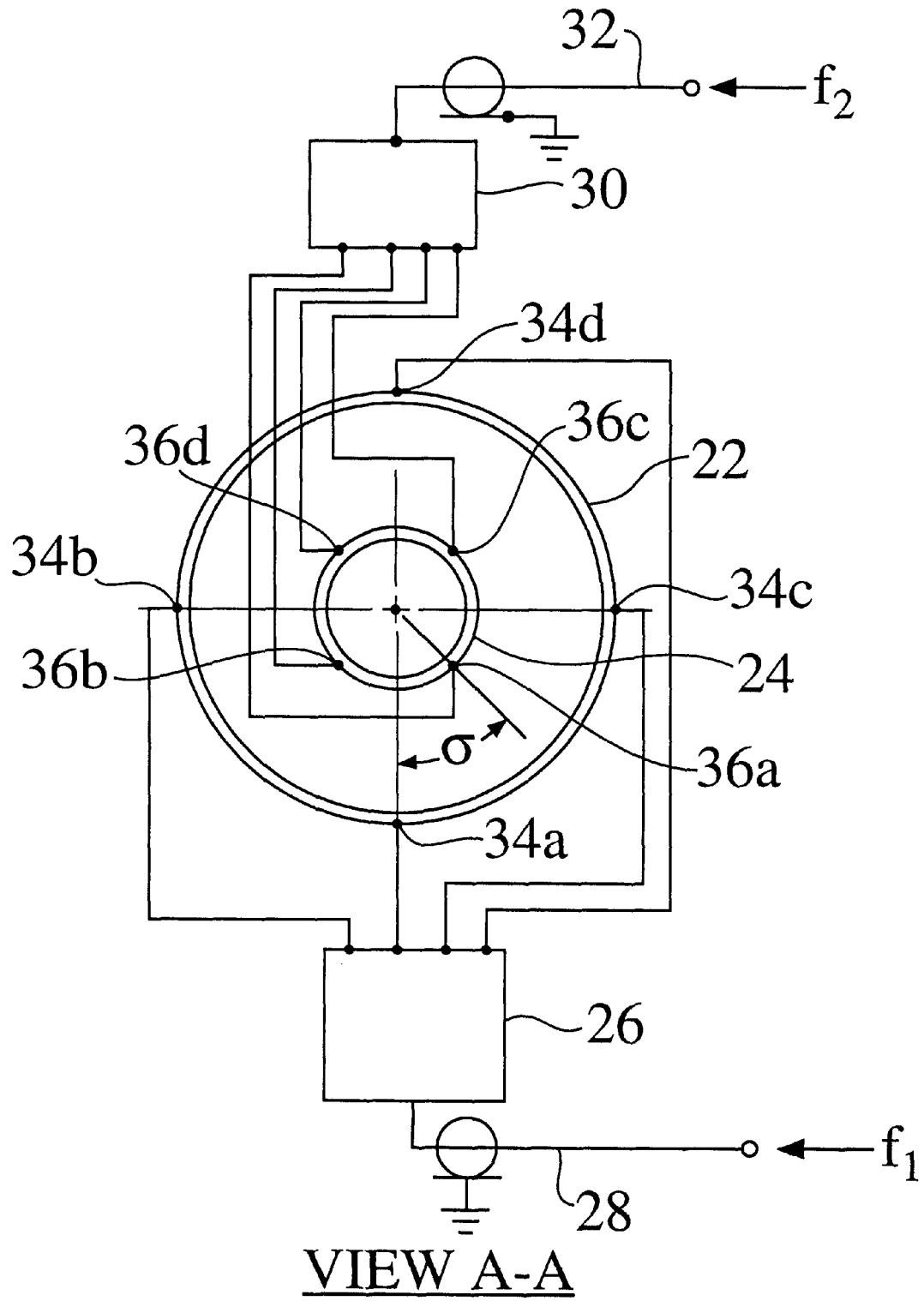
FIG. 5 is view A—A of FIG. 4 depicting feed points 90 degrees apart at one end of each of the helices and revealing the inner helix feed points "clocked" at 45 degrees from the outer helix feed points.

FIG. 5 is view A—A of FIG. 4 and depicts feed points 90 degrees apart at the start-end of each of the quadrifilar helical windings 22a–d, 24a–d. The feed points 36a–d of the UHF helix 24 are "clocked" at an angle σ from the feed points 34a–d of the VHF helix 22. In this embodiment, from Equation 2, σ=360°/(2*4)=45 degrees.

Figure 6:
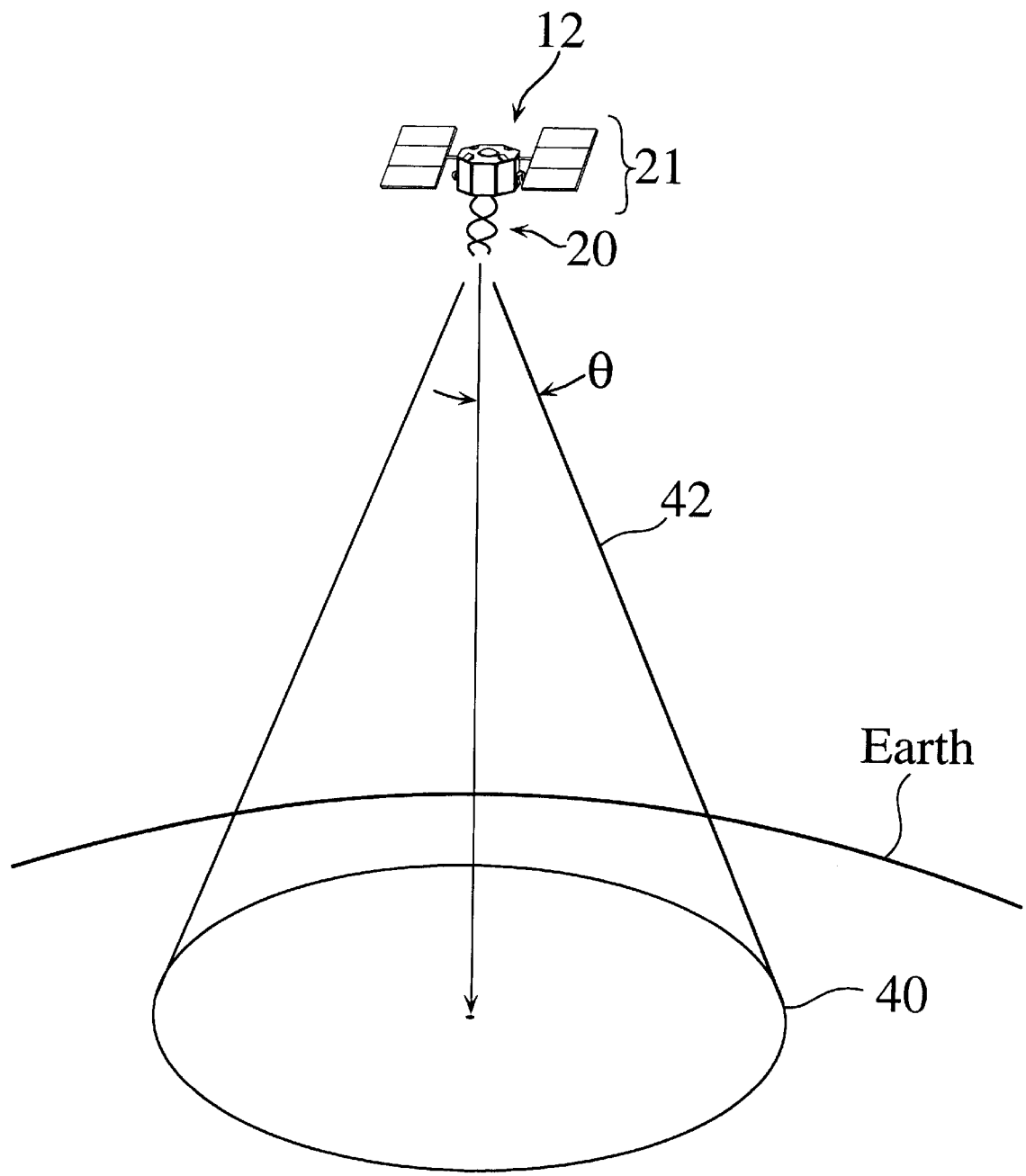
FIG. 6 is a schematic view depicting a radio beam transmitted or received in conical mode by the Multi-Band Concentric Helical Antenna deployed on a LEO satellite, and showing the beam footprint on the Earth's surface.

FIG. 6 is a schematic view depicting a radio beam 42 transmitted or received in conical mode by the Multi-Band Concentric Helical Antenna 20 deployed on a LEO satellite 12. For the antenna 20 shown, the helix axis points to the nadir. The beam footprint 40 on the Earth's surface nominally subtends 57.2 degrees at an altitude of 950 km.

Figure 7A:
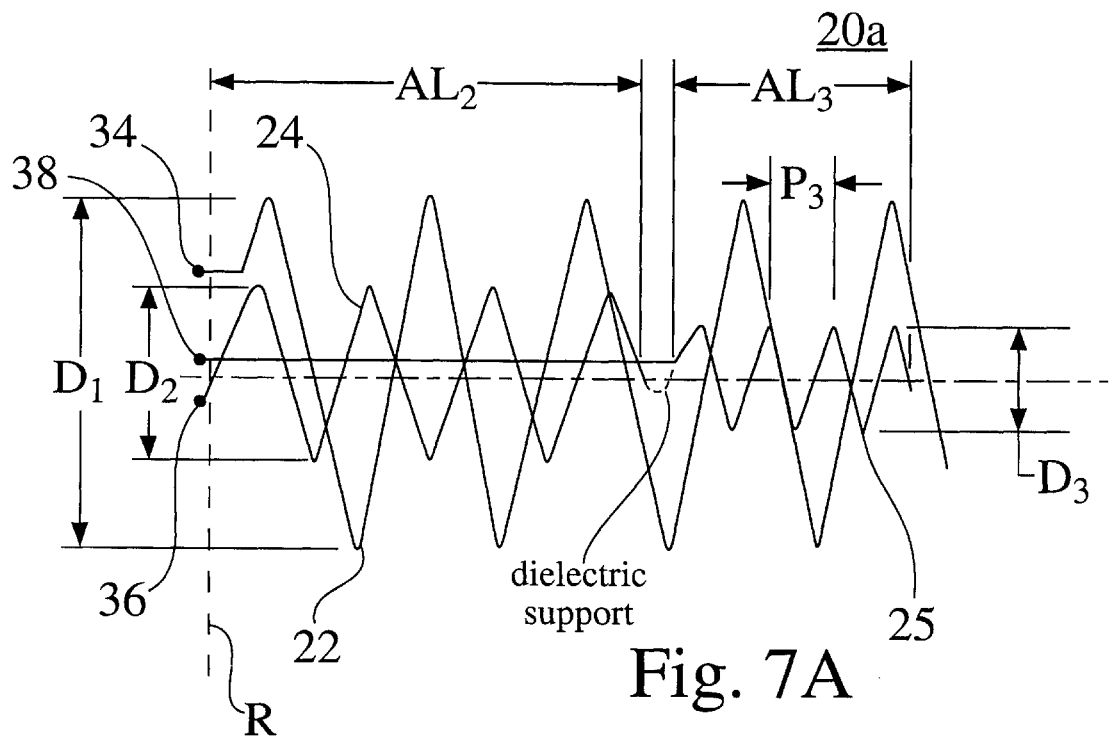
FIG. 7A is a schematic diagram which reveals a concentric helical antenna for operation in at least three frequency bands, in which there are two inner helices, disposed end-to-end on the common axis.

FIG. 7A schematically depicts an alternative embodiment 20a of the Multi-Band Concentric Helical Antenna 20 for operation in at least three frequency bands. Two inner helices 24, 25 are disposed in tandem along the antenna axis. The drawing has been simplified to show monofilar helical elements 22, 24, 25, but three or more elements can be used in the first outer helix 22, the second inner helix 24 and the third inner helix 25. For clarity, the feedlines for helices 22, 24 are not shown, however, the feed points 34, 36, 38 for each are shown at the feed-end of the helices 22, 24. Each helix is separately fed at feed points 34, 36, 38. As in FIG. 5, the feed points 36, 38 of the inner helices 24, 25 would be clocked at an angle a from the next outer helix.

Figure 7B:
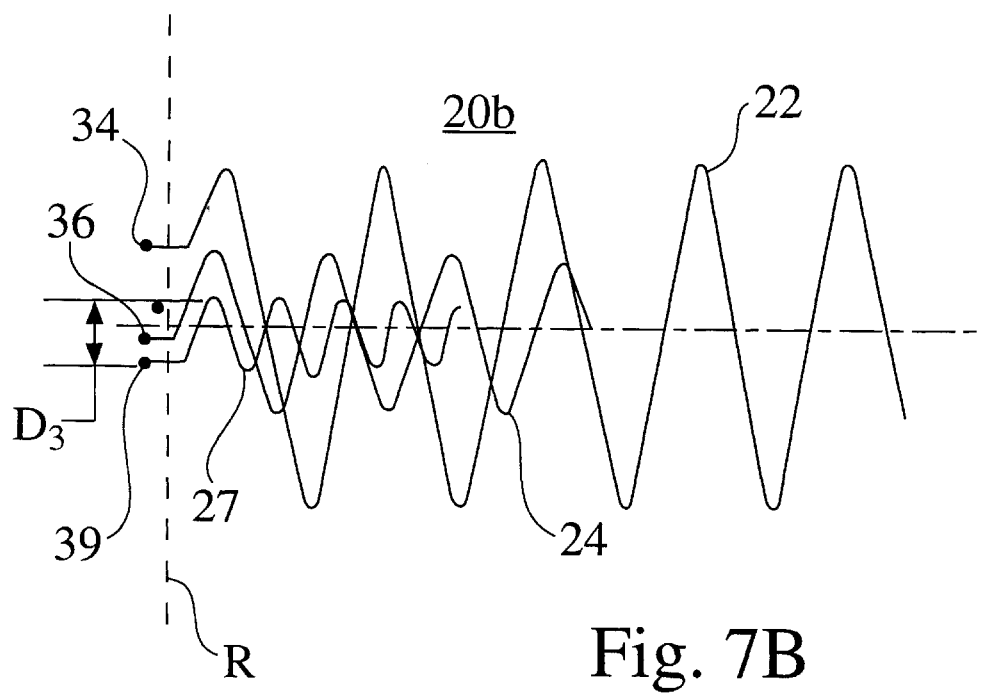
FIG. 7B is a schematic diagram which reveals a concentric helical antenna for operation in at least three frequency bands in which there are two inner helices, disposed concentrically.

FIG. 7B schematically depicts an alternative embodiment 20b of the Multi-Band Concentric Helical Antenna 20 for operation in at least three frequency bands. Two inner helices are disposed in tandem along the antenna axis. Each helix is separately fed at feed points 34, 36, 38. As in FIG. 5, the feed points of the inner helices would be clocked at an angle a from the next outer helix. The drawing has been simplified to show monofilar helical elements 22, 24, 25, but three or more elements can be used in the first outer helix 22, the second inner helix 24 and the third inner helix 25. For clarity, the feedlines for the helices are not shown, however, the feed points 34, 36, 38 for each are shown at the feed-end of the helices 22, 24, 25.

FIG. 7C is a schematic drawing of an alternative embodiment of a Multi-Band Concentric Helical Antenna 50 in which the helices 54, 56 are made from conducting tape 54a–d, 56a–d disposed on closed helix forms 52, 58. The forms 52, 58 are inflated to the operating configuration upon deployment in space. In one preferred method known in the art, the helix forms 52, 58 are folded for stowage in accordion-bellows style structures at launch. When in orbit, the forms 52, 58 are expanded by pressure provided by an inflation gas from within a deployment mechanism in the satellite body 21. The helix forms 52, 58 may be made from a thin insulating material such as Mylar™ or Kapton™. Once inflated, the forms are rigidized to retain their inflated structure by either continuous gas pressure or by a chemical vapor which cures on the inner surface of the inflatable helix forms 52, 58.

FIG. 8 is a chart depicting the typical roll-off of gain for an isoflux beam transmitted or received by a satellite antenna in low Earth orbit, from the nadir to an angle of 57.2 degrees from the nadir. In order for the flux emitted from the antenna to be constant at all points in the beam footprint 40, the antenna gain must vary with the angle from the nadir θ as the square of the distance between the satellite and the point in the beam footprint. Thus, at the nearest point to the satellite, the nadir, antenna gain must be about 7.7 dB less than the antenna gain at the edge of the footprint 40. A helical antenna operating in conical mode can be designed to approximate this roll-off.

FIG. 9 illustrates the roll-off gain of a single helix. In FIG. 9, the antenna directivity (no-loss gain; right hand circular polarization) versus angle from the helix axis (θ) is shown for a single quadrifilar helical antenna H, such as that shown in FIG. 2. It has a length AL of 100 inches, a diameter D of 15 inches and a pitch spacing p of 45 inches. The helix H is excited at one end by radio frequency energy at 137 MHz, at phase angles of 0, 90, 180 and 270 degrees. The chart indicates that the gain roll-off between θ equals 57 degrees and θ equals 0 degrees is somewhat less than the desired isoflux beam roll-off shown in FIG. 5, but similar in shape. Changes in helix dimensions can produce gain roll-off that even more closely approximate the typical isoflux profile.

FIG. 10 depicts Axial Ratio versus angle θ (angle from helix axis) for a single quadrifilar helix H, excited at a frequency of 137 MHz and fed at phase angles of 0, 90, 180 and 270 degrees. The Axial Ratio is the ratio of the two orthogonal components of the antenna's electric field. It is a measure of the circular polarization of the antenna. Axial Ratio near 0 dB, indicating good circular polarization, yields the best performance for a satellite-to-ground antenna.

FIG. 11 is a plot of directivity (no-loss gain; left hand circular polarization) versus angle from the helix axis θ of a Multi-Band Concentric Helical Antenna 20 comprising two concentric quadrifilar helices. The outer or VHF helix 22 has the same dimensions as the helix H of FIG. 9. The VHF helix 22 is excited at a frequency of 137 MHz, at 0, 90, 180 and 270 degree phase angles. In this configuration, the VHF helix 22 is wound in a right-hand direction. The inner or UHF helix 24 is also wound in a right-hand direction. To obtain performance data, the UHF helix 24 is terminated at the inputs 36a–d to the helical elements 24a–d with 50 ohm loads. Antenna feedlines commonly in use have a characteristic impedance of about 50 ohms. Thus, loads of this impedance have been used in determining the antenna performance data. The chart indicates that the gain roll-off between θ equals 57 degrees and θ equals 0 degrees is essentially the same gain roll-off shown for the single helix H of FIG. 9.

In FIG. 12, the Axial Ratio at angles of θ for a Multi-Band Concentric Helical Antenna 20 comprising two concentric quadrifilar helices, wound in the same direction is displayed. The outer, VHF helix 22 is excited similarly as in FIGS. 10, 11 and 16. This configuration exhibits the same Axial Ratio characteristic as that of FIGS. 10, 11 and 16. The direction of winding of the inner helix 24 is seen to have no effect on the axial ratio of the outer helix 22.

FIG. 13 is a plot of directivity versus angle from the helix axis θ of a Multi-Band Concentric Helical Antenna 20 comprising two concentric quadrifilar helices. The outer, VHF helix 22 is wound in a right-hand direction and the inner, UHF helix 24 is also wound in a right-hand direction.

The UHF helix 24 is excited at a frequency of 400 MHz, at 0, 90, 180 and 270 degree phase angles. To obtain performance data, the inputs 34a–d to the helical elements 22a–d of the VHF helix 22 are terminated in 50 ohm loads. Comparing this data with that of FIGS. 8, 9, 11 and 23, conical-mode gain roll-off, similar to that of the desired isoflux roll-off, the single helix H and the outer, VHF helix 22, is exhibited.

FIG. 14 shows Axial Ratio versus angles of θ for a Multi-Band Concentric Helical Antenna 20 comprising two concentric quadrifilar helices, wound in the same direction. The inner, UHF helix 24 is excited at 400 MHz as in FIG. 13. The Axial Ratio characteristic is much more desirable than the helices of FIG. 18 which are wound in opposite directions.

FIG. 15 is a plot of directivity versus angle from the helix axis θ of a Multi-Band Concentric Helical Antenna 20 comprising two concentric quadrifilar helices. The VHF helix 22 has the same dimensions as in FIG. 11 and is similarly excited. In this configuration, however, the VHF helix 22 is wound in a right-hand direction and the UHF helix 24 is wound in a left-hand direction. The chart indicates that the gain roll-off for the VHF helix 22 between θ equals 57 degrees and θ equals 0 degrees is the same as the gain roll-off for the single helix H in FIG. 9 and the concentric helices wound in the same direction as shown in FIG. 11.

FIG. 16 shows Axial Ratio versus angle θ for a Multi-Band Concentric Helical Antenna 20 comprising two concentric quadrifilar helices, wound in opposite directions, with the VHF helix 22 excited at a frequency of 137 MHz and fed at phase angles of 0, 90, 180 and 270 degrees. The inputs 36a–d to the helical elements 24a–d of the UHF helix 24 are terminated in 50 ohm loads. The chart shows the same Axial Ratio characteristic for this embodiment of the invention as for the single quadrifilar helix H, depicted in FIG. 10.

FIG. 17 is a plot of directivity versus angle from the helix axis θ of a Multi-Band Concentric Helical Antenna 20 comprising two concentric quadrifilar helices wound in opposite directions. The inner, UHF helix 24 is excited at a frequency of 400 MHz, at 0, 90, 180 and 270 degree phase angles. To obtain performance data, the inputs 34a–d to the helical elements 22a–d of the outer, VHF helix 22 are terminated in 50 ohm loads. The directivity is nearly equal to the normal polarized gain at θ between 0 and 25 degrees and drops off to a low value at 38 degrees, indicating unsatisfactory performance for satellite communications in which the VHF and UHF helices 22, 24 are wound in opposite directions.

FIG. 18 shows Axial Ratio versus angle θ for a Multi-Band Concentric Helical Antenna 20 comprising two concentric quadrifilar helices 22 & 24, wound in opposite directions. The UHF helix 24 is excited at a frequency of 400 MHz and fed at phase angles of 0, 90, 180 and 270 degrees. To obtain performance data, the inputs 34a–d to the helical elements 22a–d of the VHF helix 22 are terminated in 50 ohm loads. This chart shows the Axial Ratio characteristic for the UHF helix 24 rapidly falls off from a desired ratio of 0 db to more than 10 db down at 57 degrees. This result, compared with FIG. 14, indicates that there is a considerable degradation in circular polarization and hence degraded performance of the antenna operating in conical mode when the two helices 22, 24 are wound in opposite directions.

FIG. 19 depicts a plot of cross-polarization versus θ for a Multi-Band Concentric Helical Antenna 20 comprising two concentric quadrifilar helices wound in the same direction. The inner, UHF helix is excited at 400 MHz at 0, 90, 180 and 270 degree phase angles. Cross-polarization in this configuration is generally suppressed for θ between 0 and 57 degrees, indicated by directivity of 10 dB or more down.

FIG. 20 is a chart on which is plotted directivity versus angle from the helix axis θ of a single, quadrifilar, helical antenna H, dimensionally the same as the helical antenna H for which the data in FIG. 9 was plotted. It is excited at a frequency of 149 MHz at 0, 90, 180 and 270 degree phase angles. Gain roll-off from θ equals 57 degrees to θ equals 0 degrees is nearly the same as the gain roll-off shown for the isoflux beam in FIG. 8 and the helix of FIG. 9 excited at 137 MHz.

FIG. 21 depicts the Axial Ratio versus angle θ for a single quadrifilar helix H, excited at a frequency of 149 MHz and fed at phase angles of 0, 90, 180 and 270 degrees. This chart shows nearly constant Axial Ratio of 0 dB from θ equals 0 degrees to θ equals 57 degrees, indicating good performance of the single helix in the conical mode. While this performance is undesirable for satellite-ground communication, other useful types of communication are still possible.

FIG. 22 is a plot of directivity versus angle from the helix axis (θ) of a Multi-Band Concentric Helical Antenna 20 comprising two concentric quadrifilar helices wound in opposite directions. The outer, VHF helix 22 is excited at a frequency of 149 MHz, at 0, 90, 180 and 270 degree phase angles. To obtain performance data, the inner, UHF helix 24 is terminated at the inputs 36a–d to the helical elements 24a–d with 50 ohm loads. No appreciable difference is seen when comparing the data for the single helix H of FIG. 20.

FIG. 23 is a plot, to be compared with FIGS. 20 and 22, of directivity versus angle from the helix axis θ of a Multi-Band Concentric Helical Antenna comprising two concentric quadrifilar helices wound in the same direction and similarly excited as in FIG. 22. Comparing these charts, the direction of winding the inner, UHF, helix is seen to have no appreciable effect on gain of the outer, VHF helix 22.

The Axial Ratio versus angle θ for a Multi-Band Concentric Helical Antenna 20 shown in FIG. 24 may be compared to FIG. 21. The antenna 20 comprises two concentric quadrifilar helices 22, 24 wound in the same direction. The outer, VHF helix 22 is excited as in FIG. 23 and the inner, UHF helix 24 is terminated at its inputs 24a–d with 50 ohm loads. The Axial Ratio characteristic compares almost exactly to the desirable characteristic of the single helix antenna H of FIG. 21. When compared to FIG. 12, the Axial Ratio characteristic is seen to have changed very little with frequency over the range of θ equals 0 degrees to θ equals 57 degrees.

CONCLUSION

Although the present invention has been described with reference to a particular preferred embodiment, persons possessing ordinary skill in the art to which this invention pertains will appreciate that various modifications and enhancements may be made without departing from the spirit and scope of the claims that follow. The various dimensions and general features that have been disclosed above are intended to educate the reader about preferred embodiments and are not intended to constrain the limits of the invention or the scope of the claims. The List of Reference Characters which follows is intended to provide the reader with a convenient means of identifying elements of the invention in the Specification and Drawings. This list is not intended to delineate or narrow the scope of the claims.

LIST OF REFERENCE CHARACTERS

FIGS. 1 through 6
- 10 Satellite communication using a Multi-Band Concentric Helical Antenna
- 11a Low earth orbit (LEO)
- 11b Medium Earth orbit (MEO)
- 11c Geostationary orbit (GEO)
- 11d Highly elliptical orbit (HEO)
- 12 Satellite
- 14a Satellite-terminal uplink
- 14b Satellite-terminal downlink
- 16c Satellite-ground relay station uplink
- 16b Satellite-ground relay station downlink
- 18 Ground relay station
- 19 User terminal
- 20 Multi-Band Helical Antenna
- 21 Satellite body
- 22 Outer helix
- 22a–d "Quadrifilar," outer helix elements
- 24 Inner helix
- 24a–d "Quadrifilar," high frequency helix elements
- 26 Outer helix phase shifter
- 28 Outer helix feed line
- 30 Inner helix phase shifter
- 32 Inner helix feed line
- 34 Feed-end of outer helix
- 34a–d Feed points of outer helix
- 36 Feed-end of inner helix
- 36a–d Feed points of inner helix
- 40 Radio beam footprint
- 42 Radio beam
- AL Antenna length
- $AL_1$ Outer helix length
- $AL_2$ Inner helix length
- D Helix diameter (inches)
- $D_1$ Outer helix diameter
- $D_2$ Inner helix diameter
- FD Antenna feedline
- f Radio frequency (rf) energy
- $f_1$ Low frequency rf energy
- $f_2$ High frequency rf energy
- H Conventional helical antenna
- P Phase shifter
- P Helix pitch spacing
- $P_1$ Outer helix pitch spacing
- $P_2$ Inner helix pitch spacing
- R Reflector/ground plane
- $W_{1-4}$ Single helix element windings
- σ Angle of rotation of start of inner helix windings with respect to the start of the outer helix windings
- θ Direction from helical antenna axis
- φ Phase angle of energy supplied to antenna FIGS. 7a through 24
- 20a Alternate embodiment of a Multi-Band Concentric Helical Antenna for operation on three frequencies
- 20b Alternate embodiment of a Multi-Band Concentric Helical Antenna for operation on three frequencies
- 21 Satellite body
- 25 Inner, end-to-end, third helix
- 27 Inner, third helix
- 38 Feed point of inner, end-to-end third helix
- 39 Feed point of inner, third helix
- 50 Alternate embodiment of a Multi-Band Concentric Helical Antenna
- 52 Inflatable form for outer helix
- 54 Outer helix
- 54a–d Outer helix, conductive tape, quadrifilar helical elements
- 56 Inner helix
- 58 Inflatable form for inner helix
- $AL_1$ Outer helix length
- $AL_2$ Inner, second helix length
- $AL_3$ Inner, third helix length
- $D_1$ Outer, first helix diameter (inches)
- $D_2$ Inner, second helix diameter (inches)
- $D_3$ Inner, third helix diameter
- Eθ Value of the antenna's electric field in theta direction
- Eφ Value of the antenna's electric field in phi direction
- $P_1$ Outer helix pitch spacing
- $P_1$ Inner, second helix pitch spacing
- $P_3$ Inner, third helix pitch spacing
- LH Left-hand spiral helix
- RH Right-hand spiral helix
- R Reflector/ground plane
- θ (Theta) Direction from helical antenna axis
- Phi Direction transverse to direction theta

What is claimed is:

1. A multi-band antenna (50) comprising:

a first inflatable, non-conducting support (52), having a mounting surface at a first end;

a second inflatable, non-conducting support (58) concentrically disposed within said first inflatable, non-conducting support (52) and having a mounting surface at a first end, in common with said first inflatable, non-conducting support (52);

a plurality of first conducting tapes (54a–d);

a plurality of second conducting tapes (56a–d);

said plurality of first conducting tapes (54a–d) wound in a first helix (54) upon said first inflatable, non-conducting support (52) and having N helical elements (54a–d), where N is greater than two;

said plurality of second conducting tapes (56a–d) wound in a second helix (56) upon said second inflatable non-conducting support (58) and having M helical elements (56a–d), where M is greater than two;

said first helix (54) having a pitch spacing ($P_1$), a diameter ($D_1$) and a length ($AL_1$); said second helix (56) having a pitch spacing ($P_2$), a diameter ($D_2$) and a length ($AL_2$);

each one of said N helical elements (54a–d) being coupled at a first end to an antenna feed line through a first phasing network;

each one of said M helical elements (56a–d) being coupled at a first end to an antenna feed line through a second phasing network;

said first inflatable non-conducting support (52) being deployed in space to form said first helix (54);

said second inflatable, non-conducting support (58) being deployed in space to form said second helix (56);

said first helix (54) being excited by radiant energy at a first frequency ($f_1$) and said second helix (56) being excited by radiant energy at a second frequency($f_2$); and said first helix pitch spacing ($P_1$), diameter ($D_1$) and length ($AL_1$) and said second helix pitch spacing ($P_2$), diameter ($D_2$) and length ($AL_2$) being adjusted such that said first helix (22) and said second helix (24) each have a pattern of radiation generally characterized as a conical mode of radiation.

2. An antenna (50) as claimed in claim 1, in which said first helix (54) and said second helix (56) are wound in the same spiral direction.

3. An antenna (50) as claimed in claim 1, in which said first helix (54) and said second helix (56) are wound in opposite spiral directions.

4. An antenna (50) as claimed in claim 1, in which said first helix (54) an said second helix (56) are wound in the same spiral direction.

5. An antenna (50) as claimed in claim 1, in which said N helical elements are four helical elements (54a–d), said four helical elements (54a–d) being fed said radiant energy at a phase angle of 0 degrees, 90 degrees, 180 degrees and 270 degrees, respectively.

6. An antenna (50) as claimed in claim 1, in which said M helical elements are four helical elements (56a–d), each of said four helical elements (56a–d) being fed said radiant energy at a phase angle of 0 degrees, 90 degrees, 180 degrees and 270 ,degrees, respectively.

7. An antenna (50) as claimed in claim 1, in which said conical mode of propagation includes radiated energy which is maximum at an outer edge of a far-field footprint (40) of a projected beam (42) and varies, approximately as the distance squared along a path from said antenna (20) to said far-field footprint (40), to a minimum at a nearest point to said antenna (20) in said far-field footprint (40); said radiation pattern having nearly uniform radiated flux at all points within said far-field footprint (40).

8. An antenna (50) as claimed in claim 1, in which said second frequency ($f_2$) is at least twice said first frequency ($f_1$).

9. An antenna (50) as claimed in claim 1, in which said first frequency ($f_1$) is in a very high frequency (VHF) band and in which said second frequency ($f_2$) is in an ultra high frequency (UHF) band.

10. A method of operating a multi-band antenna (20) comprising the steps of:

supplying a first helix (22) having a pitch spacing ($P_1$), a diameter ($D_1$), and length ($AL_1$);
winding said first helix (22) in a spiral direction;
supplying a second helix (24) having a pitch spacing ($P_2$), a diameter ($D_2$) and a length ($AL_2$);
winding said second helix (24) in the same spiral direction as said first helix (22);

placing said second helix (24) within said first helix (22) generally concentrically;

driving said first helix (22) with radiant energy at a first frequency ($f_1$);

driving said second helix (24) with radiant energy at a second frequency ($f_2$);

said second frequency ($f_2$) being higher than said first frequency ($f_1$);

adjusting said first helix pitch spacing ($P_1$), diameter ($D_1$) and length ($AL_1$), and said second helix (24) pitch spacing ($P_2$), diameter ($D_2$) and length ($AL_2$) for an antenna radiation pattern generally characterized as a conical mode of radiation;

supplying a third helix (25) having a pitch spacing ($P_3$), a diameter ($D_3$) and a length ($AL_3$); winding said third helix (25) in the same spiral direction as said first helix (22) and said second helix (24);

placing said third helix (25) generally concentrically within said first helix (22);

driving said third helix (25) with said radiant energy at a third frequency ($f_3$);

said second frequency ($f_2$) being at least twice said first frequency ($f_1$);

said third frequency ($f_3$) being at least twice said second frequency ($f_2$); and adjusting said first helix pitch spacing ($P_1$), diameter ($D_1$) and length ($AL_1$), said second helix (24) pitch spacing ($P_2$), diameter ($D_2$) and length ($AL_2$) and said third helix pitch spacing ($P_3$), diameter ($D_3$) and length ($AL_3$) such that said first helix (22), said second helix (24), and said third helix (27), each have a pattern of radiation generally characterized as a conical mode of radiation.

11. A method of operating a multi-band antenna (20) as claimed in claim 10, further including the step of:

placing said third helix (25) end-to-end with said second helix (24) on a common axis.

12. A method of operating a multi-band antenna (20) as claimed in claim 10, further including the step of:

placing said third helix (25) generally concentric within said second helix (24).

13. A method of operating a multi-band antenna (20) as claimed in claim 10, in which said conical mode of radiation includes radiating energy which is maximum at an outer edge of a far-field footprint (40) of a projected beam (42) and varies, approximately as the distance squared along a path from said first helix (22) and said second helix (24) to said far-field footprint (40), to a minimum at a nearest point to said first helix (22) and said second helix (24) in said far-field footprint (40); said radiation pattern having nearly uniform radiated flux at all points within said far-field footprint (40).

* * * * *